US006567543B1

United States Patent
Shiraiwa et al.

(10) Patent No.: US 6,567,543 B1
(45) Date of Patent: *May 20, 2003

(54) IMAGE PROCESSING APPARATUS, IMAGE PROCESSING METHOD, STORAGE MEDIUM FOR STORING IMAGE PROCESSING METHOD, AND ENVIRONMENT LIGHT MEASUREMENT APPARATUS

(75) Inventors: Yoshinobu Shiraiwa, Machida (JP); Toshiyuki Mizuno, Yokohama (JP); Yumiko Hidaka, Inagi (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/941,303

(22) Filed: Sep. 30, 1997

(30) Foreign Application Priority Data

| Oct. 1, 1996 | (JP) | 8-260609 |
| Oct. 1, 1996 | (JP) | 8-260610 |
| Oct. 1, 1996 | (JP) | 8-260611 |
| Sep. 17, 1997 | (JP) | 9-252051 |

(51) Int. Cl.$^7$ ............................... G06K 9/00
(52) U.S. Cl. .................. 382/167; 382/274; 358/1.9; 358/518
(58) Field of Search ............................... 345/153, 154, 345/426, 431; 348/251, 254, 256; 358/461, 516, 518, 519, 523, 1.9; 382/162, 167, 274, 312, 317, 321; 250/372, 461.1, 494.1; 356/405, 406, 407

(56) References Cited

U.S. PATENT DOCUMENTS

| 4,699,510 A | * 10/1987 | Alguard ................. 250/461.1 |
| 5,659,406 A | * 8/1997 | Imao et al. ............. 358/518 |
| 5,754,682 A | 5/1998 | Katoh .................... 382/162 |
| 5,786,823 A | * 7/1998 | Madden et al. ......... 345/431 |

\* cited by examiner

*Primary Examiner*—Timothy M. Johnson
(74) *Attorney, Agent, or Firm*—Fitzpatrick, Cella, Harper & Scinto

(57) ABSTRACT

An image processor performs color correction corresponding to an environment light. An input device inputs white information of a recording medium and environment light information, and a correction device performs correction corresponding to a fluorescent whitening effect, for the white information of the recording medium on the basis of the environment light information. A color correction device performs color correction for an input color image information on the basis of the corrected white information of the recording medium.

8 Claims, 27 Drawing Sheets

IMAGE PROCESSING APPARATUS, IMAGE PROCESSING METHOD, STORAGE MEDIUM FOR STORING IMAGE PROCESSING METHOD, AND ENVIRONMENT LIGHT MEASUREMENT APPARATUS

BACKGROUND OF THE INVENTION

1. Field of the Invention

The present invention relates to an image processing apparatus and method for performing color correcting according to environment light, a storage medium for storing the image processing method, and an environment light measurement apparatus for measuring the environment light.

2. Related Background Art

In recent years, since color image products are widely used, a color image can be easily managed not only in a specific field such as a design production field or the like using CG (computer graphics), but also in general office. In a any case, in a case where the image formed on a monitor is outputted by a printer, since a color of the monitor image does not coincide with that of the printed image, it is difficult to perform color checking of the printed image on the monitor. Therefore, as a method to solve such a problem, a color management system has been created and remarked.

The color management system is a system for eliminating a difference in color of each device by using a common color space. This system is based on an idea that, if the colors are represented by the same coordinates in the same color space, their manifestation (or appearance) is identical. That is, in this system, all the colors are represented in the same color space and their corresponding coordinates are coincided with others to obtain coincidence in the manifestation of color. At present, as one of such systems generally used, there is a method in which the difference in color of each device is corrected by using a CIE-XYZ color space as the color space, and by using XYZ tristimulus values which are internal description coordinate values of the CIE-XYZ color space.

Hereinafter, the environment for observing the image will be explained with reference to FIG. 28. FIG. 28 shows a case where an image which is the same as printed matter 201 is displayed on a monitor 203. In this case, ambient light 204 when the image is being observed is detected by an ambient light sensor 206 mounted on the monitor or the printer.

For example, the printed image or the image displayed on a CRT is not always observed in the fixed ambient light, but the ambient light 204 in FIG. 28 varies according to an environmental situation. Further, even if color coincidence can be obtained in one ambient light, when such ambient light varies, color-coincided images come to be seen as the images completely different from others. As shown in FIG. 27, in order to eliminate this, by using the above color management system, it is predicted on the basis of ambient light-information 108 previously obtained by a sensor 109 what value (e.g., XYZ values) the respective images have when these images are observed in one environment. Then, these predicted values are reproduced as faithfully as possible by using profiles 103 and 104 for respective devices, whereby it intends to coincide the manifested color with others.

Such a conventional example will be explained hereinafter with reference to FIG. 27. Initially, an input image (i.e., printed matter) is read by a scanner 101. Then, in a scanner RGB to XYZ conversion unit 102, $R_1$, $G_1$ and $B_1$ signals obtained from the scanner 101 are converted into color signals $X_1$, $Y_1$ and $Z_1$ not depending on any device, by using the scanner profile 103 in which previously provided scanner characteristic data has been stored. Further, in a signal conversion unit 104, on the basis of the ambient light information 108 obtained from the sensor 109 for sensing the ambient light, the signals $X_1$, $Y_1$ and $Z_1$ are converted into color signals $X_2$, $Y_2$ and $Z_2$ of each color in case of observing in such ambient light. Then, in an XYZ to monitor RGB conversion unit 105, monitor input values, i.e., $R_2$, $G_2$ and $B_2$ signals, are calculated by using the monitor profile 106 and inputted to the monitor 107.

In the above conventional method, if the two colors have the same value in the common color space, they should be seen as the same. However, in a case where the color displayed on the monitor is compared with the color obtained by illumination (e.g., color on printed matter), it has been conventionally known that, even if these two colors have the same value, they can not be seen as the same by an observer. For this reason, in order to perceive or observe these two colors as the same by the naked eye in the above environment, further correcting is necessary.

In case of the printer, the profile can be obtained by adding various image data to the target device, measuring the color of the output image from the target device, and forming a table in which the various image data respectively correspond to the color-measured values. However, since it is assumed that environment illumination light in case of forming the profile has a value of standard illumination light which is determined by CIE and has spectral intensity as shown in FIG. 16, color change ratio of the CRT becomes different from that of the printed matter if the environment illumination light varies, whereby the colors on the CRT and the printed matter are observed as being different from each other. Therefore, in case of performing strict color matching, it is necessary to make the standard illumination light and the environment illumination light substantially the same when the profile is formed, and to measure a kind of the environment illumination light to further add a color correction process.

SUMMARY OF THE INVENTION

In case of observing colors, it is thought that a human being considers white as a standard color and thus recognizes all colors by comparing them with white. In this connection, it will be thought an example that a displayed image on a monitor and an image on printed matter both placed in one ambient light (i.e., environment light) are observed.

In such environment, there are many colors which are considered (or can be perceived) as white, e.g., white on the monitor, white in illumination light, white in an image (or paper) illuminated by the illumination light, and the like.

In a case where there are many colors which can be perceived as white in observation environment, an observer in such environment obtains the white acting as the standard when observing the color, by collecting perception as to the above-described whites in the many environments (i.e., white on the monitor, white in illumination light, white in an image (or paper) illuminated by the illumination light, and the like). At this time, the white perceived on the printed matter (i.e., white of the image (or paper) illuminated by the illumination light) and the white on the monitor highly affect the case of obtaining the standard white by collecting the perception, as compared with another white. For this reason, even if the identical illumination light is used, if the white (i.e., chromaticity value) of the paper used when obtaining the printed matter (i.e., hard copy) differs, also the standard white when observing the color highly differs.

Therefore, an object of a first invention is to realize highly accurate matching by performing color signal converting on the basis of the white of a recording medium and the white of the environment light.

In order to achieve the above object, the first invention provides an image processing method for performing the color signal converting on image data to make identical of color sight on a displayed image and color sight on an image formed on the recording medium, comprising the steps of:

obtaining information as to the white which is perceived on the formed image illuminated by the environment light, on the basis of information as to the recording medium and information as to the image processing environment light; and performing the color signal converting by using the information as to the white obtained in the obtaining step and the information as to the white on a display device.

Further, the paper or ink which is the base material of the output printed matter tends to use a fluorescent whitening agent to improve a coloring characteristic. For this reason, e.g., as shown in FIG. 12 which illustrates a change in reflectance on the paper with UV-range (ultraviolet-range) illumination intensity, if the UV-range illumination intensity increases, the reflectance exceeds 100% in a partial wavelength (i.e., color) range due to fluorescent whitening effect, whereby the coloring characteristic varies.

Therefore, an object of a second invention is to be able to produce a high-quality output image by performing a correction process which takes into consideration the fluorescent whitening effect according to the UV-range illumination intensity.

In order to achieve the above object, the second invention provides an image processing apparatus comprising:

illumination light measurement means for measuring the illumination light, the means being composed of an optical sensor for measuring the UV-range illumination intensity and an optical sensor for measuring visible-range illumination intensity; and correction process means for performing the correction process on the image data to correct the fluorescent whitening effect on the recording medium in accordance with a measurement result of the measurement means.

In the conventional method where environment illumination light under which the observing is performed is measured and the color correcting is performed, as shown in FIG. 26, such measuring is performed by a light sensor which has three-color, R (red), G (green) and B (blue) sensitivity of visible-range light (i.e., wavelength 380 to 780 nm), to judge color temperature and the environment illumination light thereby performing the color correcting. However, in such conventional method to measure and correct the color temperature with the three colors, there is a problem that such method can not be applied to a fluorescent lamp of which color rendering is deteriorated due to influence of a luminescent line or to a light source in which the fluorescent lamp and other lamps are mixed. For example, as shown in FIG. 12, if such illumination light which can be frequently seen in an office is measured in a spectral method, the influence of external light and the luminescent line clearly appears. Such influence could not be eliminated only by detecting a flicker and the luminescent line of the fluorescent lamp. Further, according to the measuring by the light sensor of the three colors including the luminescent line, a wavelength output of the luminescent line is large, whereas other wavelength outputs are relatively small. Thus, it is difficult to accurately measure the change in the illumination light in which the external light is included. For this reason, it has to use the spectral measurement method having loads in time and cost.

Therefore, an object of a third invention is to be able to accurately identify, with simple structure, the environment illumination light without the influence of the luminescent line of the light source.

In order to achieve the above object, the third invention provides an image processing apparatus comprising:

environment illumination light measurement means which is composed of a shorter-wavelength light detection unit having sensitivity in a wavelength band in which a peak of a main spectral sensitivity characteristic does not coincide with a peak of a main luminescent line of the fluorescent light, and a longer-wavelength light detection unit having sensitivity at a point where the spectral sensitivity characteristic corresponds to red; and environment illumination light identification means for identifying environment illumination light by using a signal from the environment illumination light measurement means.

Further, in the conventional method where the environment illumination light under which the observing is performed is measured and the color correcting is performed, as shown in FIG. 26, such measuring is performed by the light sensor which has the three-color, R, G and B sensitivity of visible-range light (e.g., wavelength 380 to 780 nm), to judge the color temperature and the environment illumination light, thereby performing the color correcting. However, in such conventional method to measure and correct the color temperature with the three colors, since a wavelength range to be detected is wide, there is a problem that the fluorescent lamp or the like having the luminescent line can not be discriminated as the light source.

For this reason, in an improved conventional method, the luminescent line and the flicker are detected to judge whether or not the environment illumination light is the fluorescent illumination light. However, the illumination light which can be frequently seen in the office is the various light including the fluorescent lamp and other light source. For example, as shown in FIG. 24, if such environment illumination light is measured in the spectral method, the influence of the luminescent line clearly appears in the external light, whereby such environment illumination light is erroneously judged as the fluorescent illumination light.

In this case, however, if the environment illumination light is considered as the fluorescent illumination light and thus the color image process is performed, the reproduction color is incorrect. Further, according to a kind of the fluorescent lamp and a time elapsing for use of the fluorescent lamp, the color rendering differs. For this reason, in case of performing the accurate color reproduction, it had to use the spectral measurement method having the loads in time and cost.

Therefore, an object of a fourth invention is to be able to easily and highly accurately obtain the color rendering of the environment light which affects the color reproduction.

In order to achieve the above object, the fourth invention provides an image processing apparatus comprising:

a first sensor of which main spectral sensitivity characteristic has sensitivity in the vicinity of the main luminescent line of the fluorescent lamp;

a second sensor of which main spectral sensitivity characteristic does not include the main luminescent line of the fluorescent lamp; and means for obtaining the color rendering of the environment light, on the basis of outputs of the first and second sensors.

Further, an object of a fifth invention is to provide an environment light measurement apparatus which can measure the environment light with simple structure.

In order to achieve the above object, the fifth invention provides the environment light measurement apparatus comprising:

first light detection means of which main spectral sensitivity characteristic has sensitivity in the vicinity of the wavelength 546 nm being the main luminescent line of the fluorescent lamp; and second light detection means of which main spectral sensitivity characteristic has sensitivity in a wavelength band of 650 nm or longer not including the main luminescent line and in the vicinity of the wavelength 480 nm.

Further, in order to achieve the above object, the fifth invention provides the environment light measurement apparatus comprising:

first light detection means of which main spectral sensitivity characteristic has sensitivity in the vicinity of the wavelength 546 nm being the main luminescent line of the fluorescent lamp;

second light detection means of which main spectral sensitivity characteristic has sensitivity in the wavelength band of 650 nm or longer not including the main luminescent line; and color temperature measurement means for measuring the color temperature of the environment light.

The above and other objects, features, and advantages of the present invention will be apparent from the detailed description and the appended claims in conjunction with the accompanying drawings.

DETAILED DESCRIPTION OF THE PREFERRED EMBODIMENTS (First Embodiment)

Figure 1:
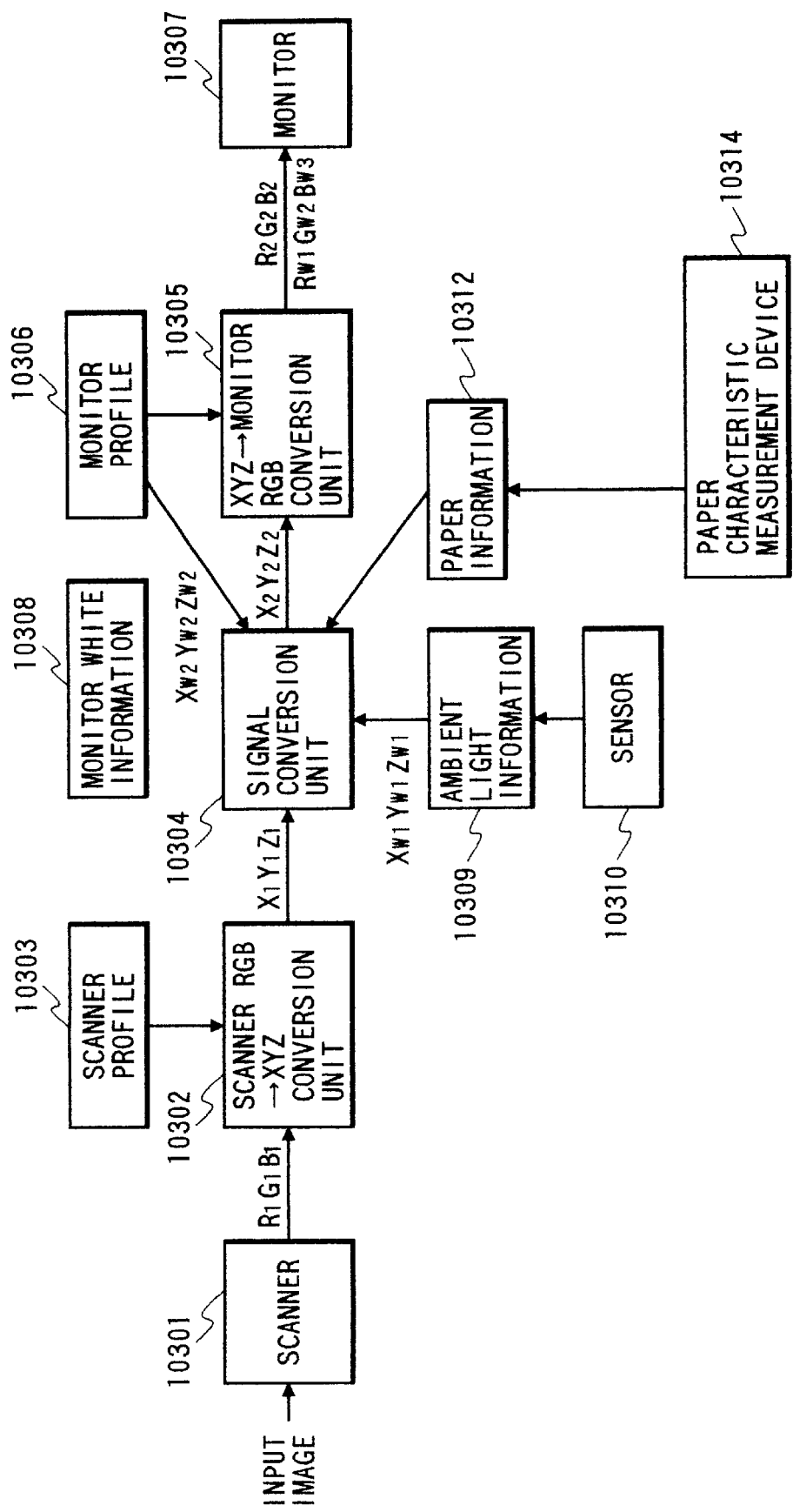
FIG. 1 is a block diagram showing data flow according to a first embodiment of the present invention.

FIG. 1 is a block diagram showing data flow according to the first embodiment of the present invention. That is, FIG. 1 shows a case where printed matter is read by a scanner and displayed on a monitor such that a displayed color and a color of the printed matter can be seen as identical.

In the present embodiment, a scanner RGB to XYZ conversion unit 10302, a signal conversion unit 10304 and an XYZ to monitor RGB conversion unit 10305 respectively perform processing under the control of a CPU (central processing unit) on the basis of programs stored in a host computer.

An input image (i.e., printed matter) is read by a scanner 10301 to generate an image signal. Then, $R_1$, $G_1$ and $B_1$ signals obtained from the scanner 10301 are converted into $X_1$, $Y_1$ and $Z_1$ signals not depending on any device by the scanner RGB to XYZ conversion unit 10302, on the basis of information from a scanner profile 10303 in which a scanner characteristic has been stored.

In this converting, firstly, in consideration of an input gamma characteristic, look-up table converting is performed on each of the R, G and B signals.

$$R_1' = LUT_R(R_1)$$
$$G_1' = LUT_G(G_1)$$
$$B_1' = LUT_B(B_1)$$

Subsequently, converting from the scanner R, G and B signals into the X, Y and Z signals is performed by using a 3×3 matrix $MTX_{RGB2XYZ}$.

$$\begin{bmatrix} X_1 \\ Y_1 \\ Z_1 \end{bmatrix} = MTX_{RGB2XYZ} \begin{bmatrix} R_1' \\ G_1' \\ B_1' \end{bmatrix}$$

A color space used in this conversion is not limited to an XYZ color space. That is, any color space capable of absorbing difference in devices can be used (e.g., CIE LUV, CIE LAB and the like).

In the scanner profile 10303, data (color conversion matrix (RGB to XYZ), LUT and the like as described above) concerning a color characteristic of the scanner has been stored.

Further, the obtained $X_1$, $Y_1$ and $Z_1$ signals are supplied to the signal conversion unit 10304. In the signal conversion unit 10304, standard white is obtained on the basis of ambient light information 10309 from a sensor 10310, paper information 10312 from a paper characteristic measurement device (color measurement device) 10314 and monitor white information 10308 from a monitor profile 10306, and signal processing is performed by using this standard white. Then, the $X_1$, $Y_1$ and $Z_1$ signals are converted into $X_2$, $Y_2$ and $Z_2$ signals taking into consideration that the printed matter and the displayed matter on the monitor render the identical color sight to an operator or an observer in such observing environment. This conversion is performed by applying a Von Kries equation taking into consideration color adaptivity.

$$\begin{bmatrix} X_2 \\ Y_2 \\ Z_2 \end{bmatrix} = M^{-1} \cdot D \cdot M \cdot \begin{bmatrix} X_1 \\ Y_1 \\ Z_1 \end{bmatrix}$$

$$D = \begin{bmatrix} R_W/R_{WI} & 0 & 0 \\ 0 & G_W/G_{WI} & 0 \\ 0 & 0 & B_W/B_{WI} \end{bmatrix}$$

$$\begin{bmatrix} R_{WI} \\ G_{WI} \\ B_{WI} \end{bmatrix} = M \begin{bmatrix} X_{WI} \\ Y_{WI} \\ Z_{WI} \end{bmatrix}$$

$$\begin{bmatrix} R_W \\ G_W \\ B_W \end{bmatrix} = M \begin{bmatrix} X_W \\ Y_W \\ Z_W \end{bmatrix}$$

The matrix M is a matrix for converting tristimulus values XYZ represented by CIE XYZ color system into response amounts RGB of a photoreceptor (cone) level of the human eye. The tristimulus values $X_{W1}Y_{W1}Z_{W1}$ are the tristimulus values of the white (observation environment white) acting as the standard when mainly seeing the printed matter, and obtained from the ambient light information and the paper information. The tristimulus values $X_W Y_W Z_W$ are the tristimulus values of the white (standard white) acting as the standard when watching mainly the monitor, and obtained from the ambient light information, the paper information (if there is paper in such environment) and the monitor white information.

In the monitor profile 10306, data (monitor color temperature, light emission luminance, chromaticity value of fluorescent body, color conversion information from standard color space into color signal depending on device, and the like) concerning a color characteristic of the monitor has been stored.

Subsequently, the $X_2$, $Y_2$ and $Z_2$ signals which were obtained by the signal conversion unit 10304 and do not depend on any device are converted into $R_2$, $G_2$ and $B_2$ signals which are monitor device signals, by the XYZ to monitor RGB conversion unit 10305 on the basis of the information of the monitor profile 10306 in which the monitor characteristic has been stored. In this case, initially, converting from the X, Y and Z signals into the monitor R, G and B signals is performed by using a 3×3 matrix $MTX_{XYZ2RGB}$.

$$\begin{bmatrix} R_2' \\ G_2' \\ B_2' \end{bmatrix} = MTX_{XYZ2RGB} \begin{bmatrix} X_2 \\ Y_2 \\ Z_2 \end{bmatrix}$$

Subsequently, in consideration of a monitor output gamma characteristic, the look-up table converting is performed on each of the R, G and B signals.

$$R_2 = LUT_R(R_2')$$
$$G_2 = LUT_G(G_2')$$
$$B_2 = LUT_B(B_2')$$

After that, the $R_2$, $G_2$ and $B_2$ signals are sent to a monitor 10307 to display an image according to these signals on a monitor image plane.

By such procedure, in such observation environment, the image on the printed matter can be displayed on the monitor such that the color of the image on the printed matter can be seen as identical with the color of the displayed image.

Figure 2:
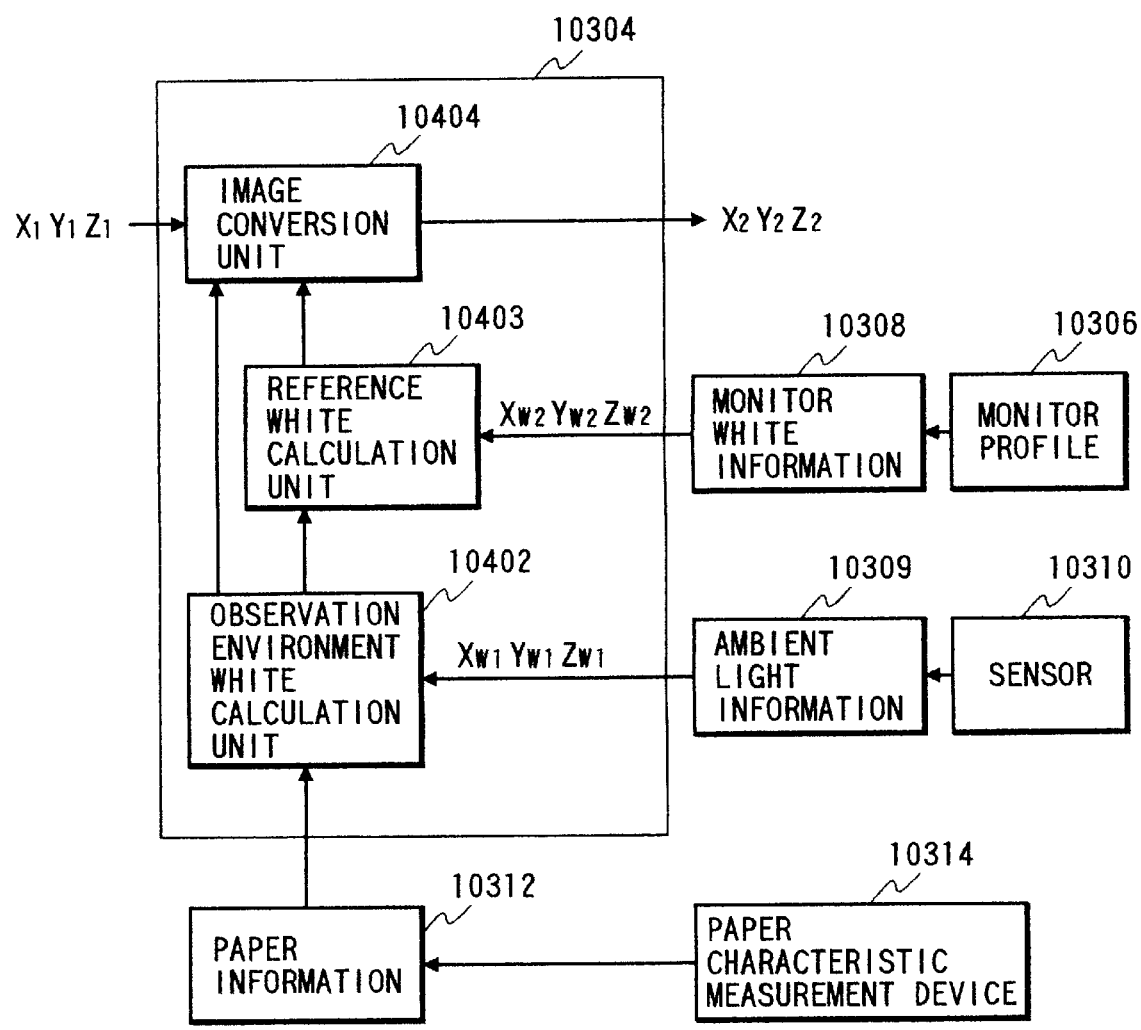
FIG. 2 is a block diagram showing structure of a signal conversion unit according to the first embodiment.

Subsequently, details of the signal conversion unit 10304 which constitutes the feature of the present invention will be explained on the basis of an example, i.e., a case where the image is observed by using one standard light source as the illumination light (i.e., environment light), with reference to FIG. 2.

Figure 6:
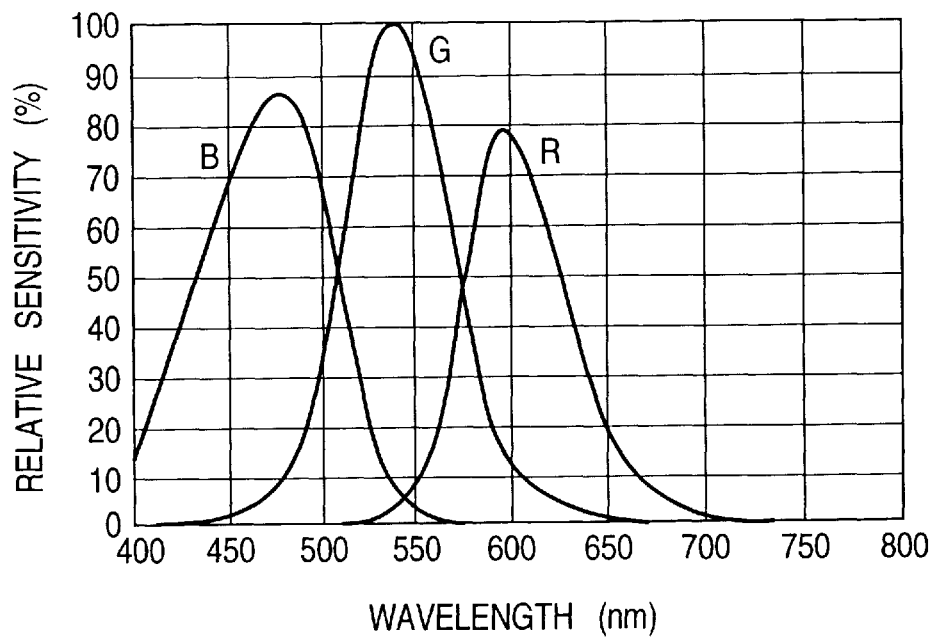
FIG. 6 is a view showing a spectral sensitivity characteristic of a sensor.
Figure 7:
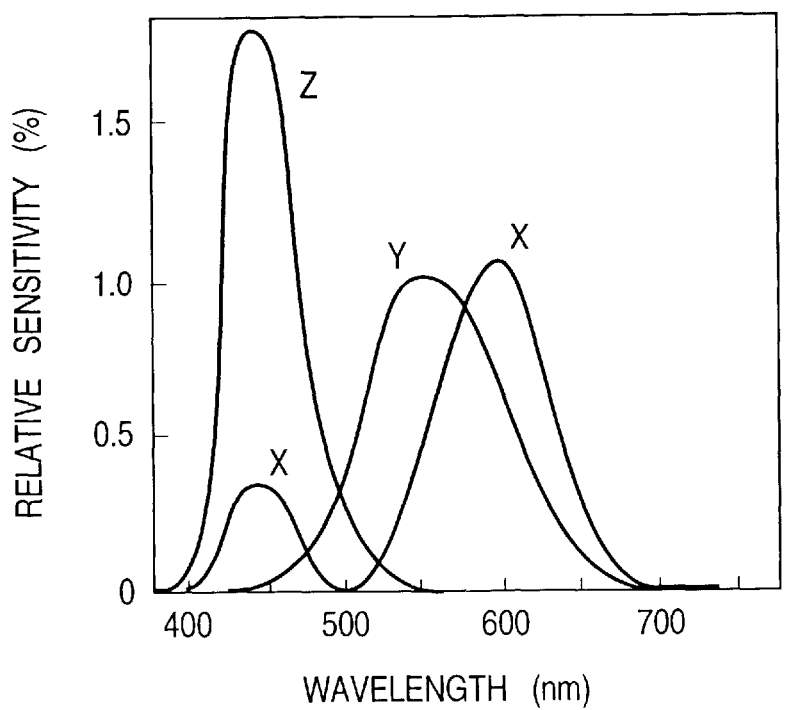
FIG. 7 is a view showing the spectral sensitivity characteristic for obtaining tristimulus values XYZ.

Initially, the ambient light information 10309 is obtained from the sensor 10310 provided in an input/output device such as the monitor, the printer or the like. In this case, a device which outputs the ambient light information as tristimulus values $X_{WO}Y_{WO}Z_{WO}$ is used as the sensor 10310. The tristimulus values $X_{WO}Y_{WO}Z_{WO}$ represent the color (white) of the ambient light at this time. The sensor 10310 has circuit structure which uses three light sensors respectively having different spectral sensitivity characteristics shown in FIG. 6. Outputs $R_{SO}G_{SO}B_{SO}$ can be obtained respectively from the three light sensors in accordance with the respective spectral sensitivity characteristics. A spectral sensitivity characteristic for obtaining the tristimulus values XYZ is shown in FIG. 7, and is different from the spectral sensitivity characteristic (FIG. 6) of this sensor. Therefore, it is necessary to convert the sensor outputs $R_{SO}G_{SO}B_{SO}$ into the tristimulus values $X_{WO}Y_{WO}Z_{WO}$ In the present embodiment, such converting is performed by using the 3×3 matrix $MTX_{senser}$ in a following equation.

$$\begin{bmatrix} X_{WO} \\ Y_{WO} \\ Z_{WO} \end{bmatrix} = MTX_{senser} \begin{bmatrix} R_{SO} \\ G_{SO} \\ B_{SO} \end{bmatrix}$$

Such matrix calculating is performed by a digital signal process circuit provided in the circuit structure.

Subsequently, the paper information 10312 is obtained from the paper characteristic measurement device 10314. As the paper characteristic measurement device 10314, a device is used which provides a light reception unit for outputting tristimulus values $X_{go}Y_{go}Z_{go}$ as the information of incident light in the same manner as in the sensor 10310 and further a light emission unit of which light emission tristimulus values $X_{eo}Y_{eo}Z_{eo}$ have already been known. The paper characteristic measurement device having such structure outputs tristimulus values $X_{wp}Y_{wp}Z_{wp}$, defined in the following equations, as the paper characteristic, by illuminating light from the light emission unit and receiving reflected light from the paper with the light reception unit.

$X_{wp}=X_{go}/X_{eo}$ $Y_{wp}=Y_{go}/Y_{eo}$ $Z_{wp}=Z_{go}/Z_{eo}$

Above calculating is performed by a signal process circuit provided within the paper characteristic measurement device 10314.

From this device, the above tristimulus values $X_{WP}Y_{WP}Z_{WP}$ are obtained as the paper information, and ambient light tristimulus values $X_{WO}Y_{WO}Z_{WO}$ are obtained as the ambient light information. Then, by using these values, observation environment white $X_{W1}Y_{W1}Z_{W1}$ is obtained from the following equations.

$X_{W1}=X_{WP}\cdot X_{WO}$ $Y_{W1}=Y_{WP}\cdot Y_{WO}$ $Z_{W1}=Z_{WP}\cdot Z_{WO}$ On the other hand, the monitor white information 10308, i.e., tristimulus values $X_{W2}Y_{W2}Z_{W2}$, concerning the white of the monitor for displaying the image is obtained from the monitor profile 10306.

Then, by using the above-described observation environment color and the monitor white, the standard white $X_W Y_W Z_W$ is obtained from the following equations.

$X_W=(1-s)\cdot X_{W1}+s\cdot X_{W2}$ $Y_W=(1-s)\cdot Y_{W1}+s\cdot Y_{W2}$ $Z_W=(1-s)\cdot Z_{W1}+s\cdot Z_{W2}$ The reference symbol s denotes a parameter which represents the influence of the monitor white and the observation environment white to the standard white.

Finally, by using the standard white signal and the observation environment white calculated in the above manner respectively by a standard white calculation unit 10403 and an observation environment white calculation unit 10402, the converting is performed on the entire image in the image conversion unit 10404 by applying the Von Kries equation in such manner as above.

By this operating, a color adaptation characteristic in case of observing the image displayed on the monitor can be considered.

Therefore, the standard white can be accurately obtained. Thus, when the entire image is converted by using such standard white signal, the identical color appearance can be obtained in sufficient accuracy from the displayed image on the monitor and the image on the printed matter.

(Second Embodiment)

Figure 3:
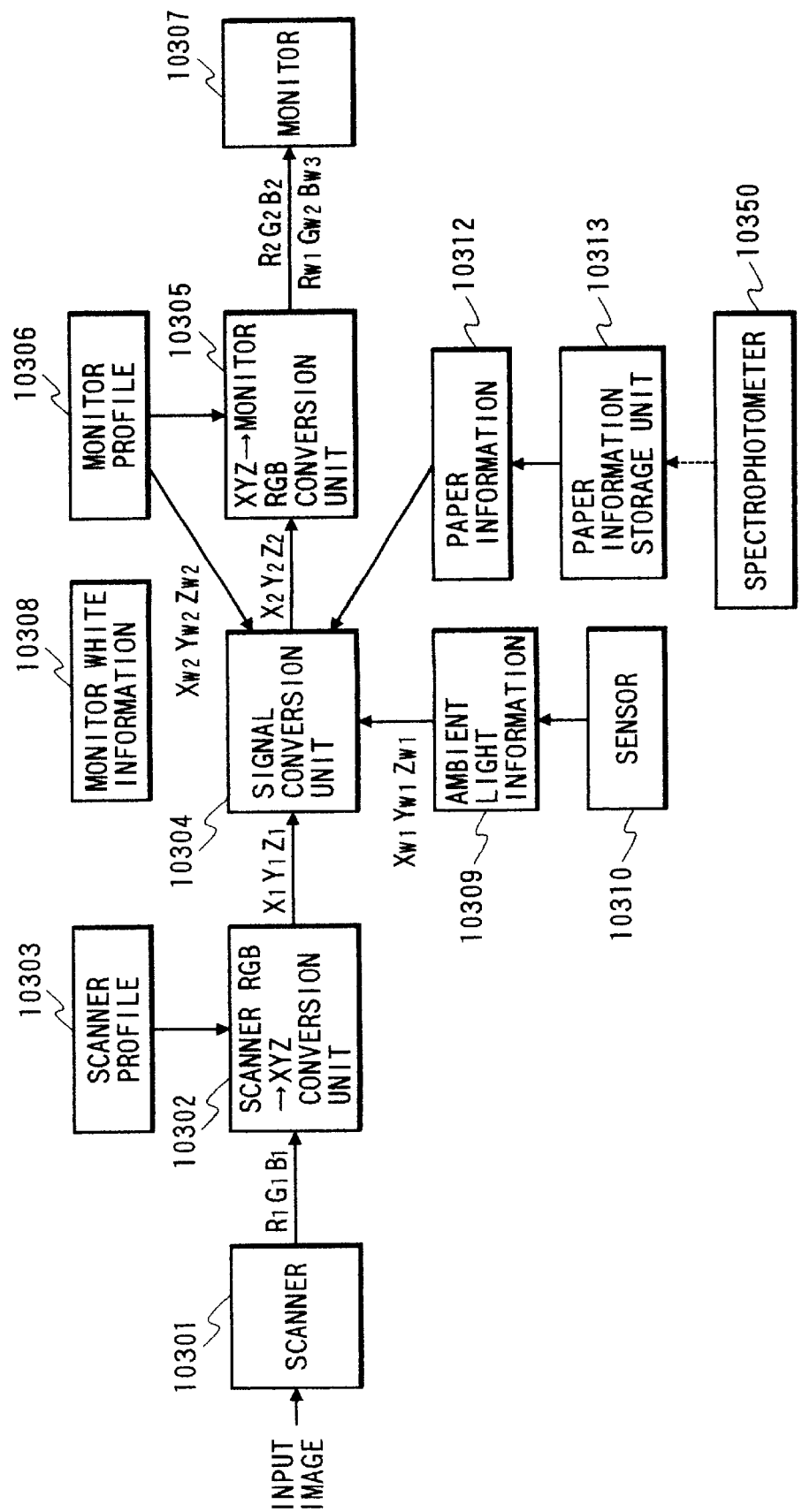
FIG. 3 is a block diagram showing data flow according to a second embodiment of the present invention.
Figure 4:
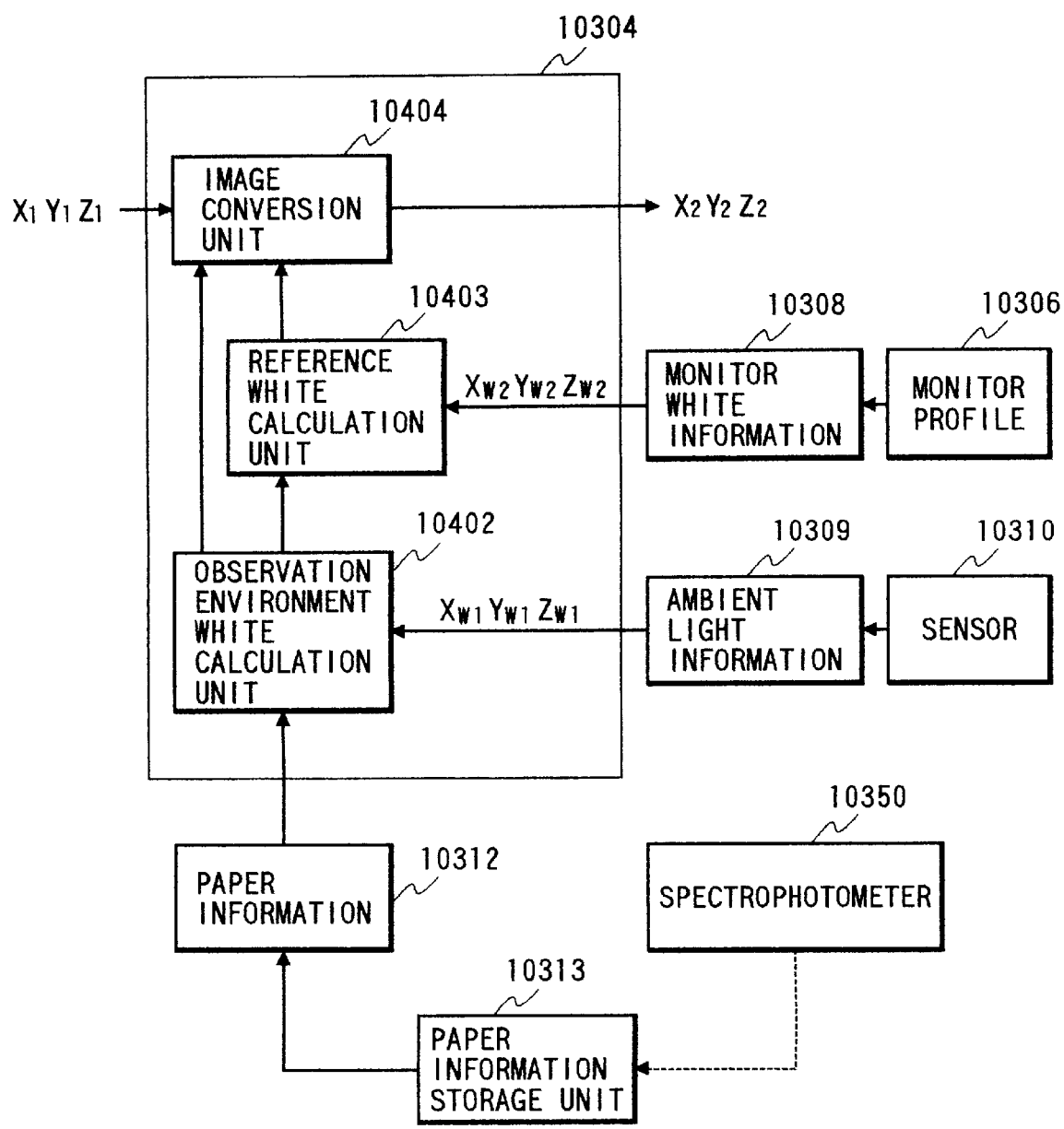
FIG. 4 is a block diagram showing structure of a signal conversion unit according to the second embodiment.

It will be explained the second embodiment in which a paper information storage unit 10313 is provided as a part of a system, with reference to FIGS. 3 and 4. In the present embodiment, paper information 10312 is obtained from the paper information storage unit 10313. Further, the present embodiment is effective in a case where a kind of a paper or the like to be used is limited to a specific one. Tristimulus values obtained by a color measurement device provided outside the system are inputted to the paper information storage unit 10313 as the paper information, by using media such as a floppy disk and the like. Although numerals can be directly inputted by using a keyboard or the like, the former method (i.e., media input) is used in the present embodiment. From among such information previously inputted, in accordance with the paper of printed matter which is being observed (i.e., remarked) presently, the corresponding paper information 10312 is selectively obtained from the paper information storage unit 10313 and used. An instruction for such selection is sent through an instruction input means which is independently provided in the system. In the present embodiment, the keyboard is used as the instruction input means. A method for obtaining the observation environment white from ambient light information 10309 and the paper information 10312 is the same as that in the first embodiment.

Another application example will be explained hereinafter.

Data which was obtained by measuring of a spectrophotometer 10350 and then inputted and stored in the paper information storage unit 10313 is spectral reflectance. When spectral intensity is similarly obtained as the ambient light information 10309, the observation environment white is obtained as tristimulus values of an XYZ color space, by the following equations.

$x_{w1}=\int R(\lambda)\cdot P(\lambda)\cdot x(\lambda)d\lambda$ $Y_{w1}=\int R(\lambda)\cdot P(\lambda)\cdot y(\lambda)d\lambda$ $Z_{w1}=\int R(\lambda)\cdot P(\lambda)\cdot z(\lambda)d\lambda$ In these equations, reference symbols $X_{W1}Y_{W1}Z_{W1}$ are tristimulus values of the observation environment white to be obtained. Reference symbols $R(\lambda)$ and $P(\lambda)$ denote the spectral intensity of ambient light and the spectral reflectance of paper, respectively. Further, reference symbols $x(\lambda)$, $y(\lambda)$ and $z(\lambda)$ denote color matching functions, respectively. By these equations, the observation environment white can be accurately obtained.

Further, other application examples will be explained hereinafter.

A characteristic of the paper is obtained as a 3×3 characteristic matrix $MTX_P$, and then the obtained paper characteristic matrix $MTX_P$ is inputted and stored in the paper information storage unit 10313 as the paper information 10312. Such paper characteristic matrix $MTX_P$ renders the white (represented by tristimulus values $X_P Y_P Z_P$) of the paper under one light source (represented by tristimulus values $X_1 Y_1 Z_1$). In this application example, the paper characteristic matrix $MTX_P$ is obtained in following procedure.

That is, as to one paper, its tristimulus values $X_P Y_P Z_P$ under the plurality of light sources are obtained by using a color measurement device which outputs the tristimulus values. On the other hand, the tristimulus values $X_1Y_1Z_1$ of the plurality of light sources are obtained in the similar manner. Then, it is assumed the following equation as a relation between the tristimulus values $X_PY_PZ_P$ of the paper under one light source and the tristimulus values $X_1Y_1Z_1$ of the light sources.

$$\begin{bmatrix} X_P \\ Y_P \\ Z_P \end{bmatrix} = MTX_P \begin{bmatrix} X_1 \\ Y_1 \\ Z_1 \end{bmatrix}$$

A least square method is executed by using tristimulus value color measurement data of the plurality of light sources and tristimulus value color measurement data of the paper, and components of the characteristic matrix $MTX_P$ are determined and obtained. In this application example, the tristimulus value color measurement data of the plurality of light sources and the tristimulus value color measurement data of the paper are obtained by estimation of a practical examination as described above. However, if an optical reflectance characteristic of the paper and an optical intensity distribution of the plurality of light sources are already known, the above data can be obtained also by performing numeral calculating with use of these optical characteristics.

Observation environment white $X_{W1}Y_{W1}Z_{W1}$ is obtained by using the matrix $MTX_P$ as the paper characteristic and using tristimulus values $X_{WO}Y_{WO}Z_{WO}$ as the ambient light information, on the basis of the following equation.

$$\begin{bmatrix} X_{W1} \\ Y_{W1} \\ Z_{W1} \end{bmatrix} = MTX_P \begin{bmatrix} X_{WO} \\ Y_{WO} \\ Z_{WO} \end{bmatrix}$$

Accordingly, as compared with the above-described method in which the ambient light information and the paper information are rendered as the spectral data, although accuracy is slightly deteriorated, a necessary data amount can be reduced. Further, since the necessary ambient light data is the tristimulus values, the sensor for obtaining the data as to the ambient light can be made with a simple structure.

(Third Embodiment)

Figure 5:
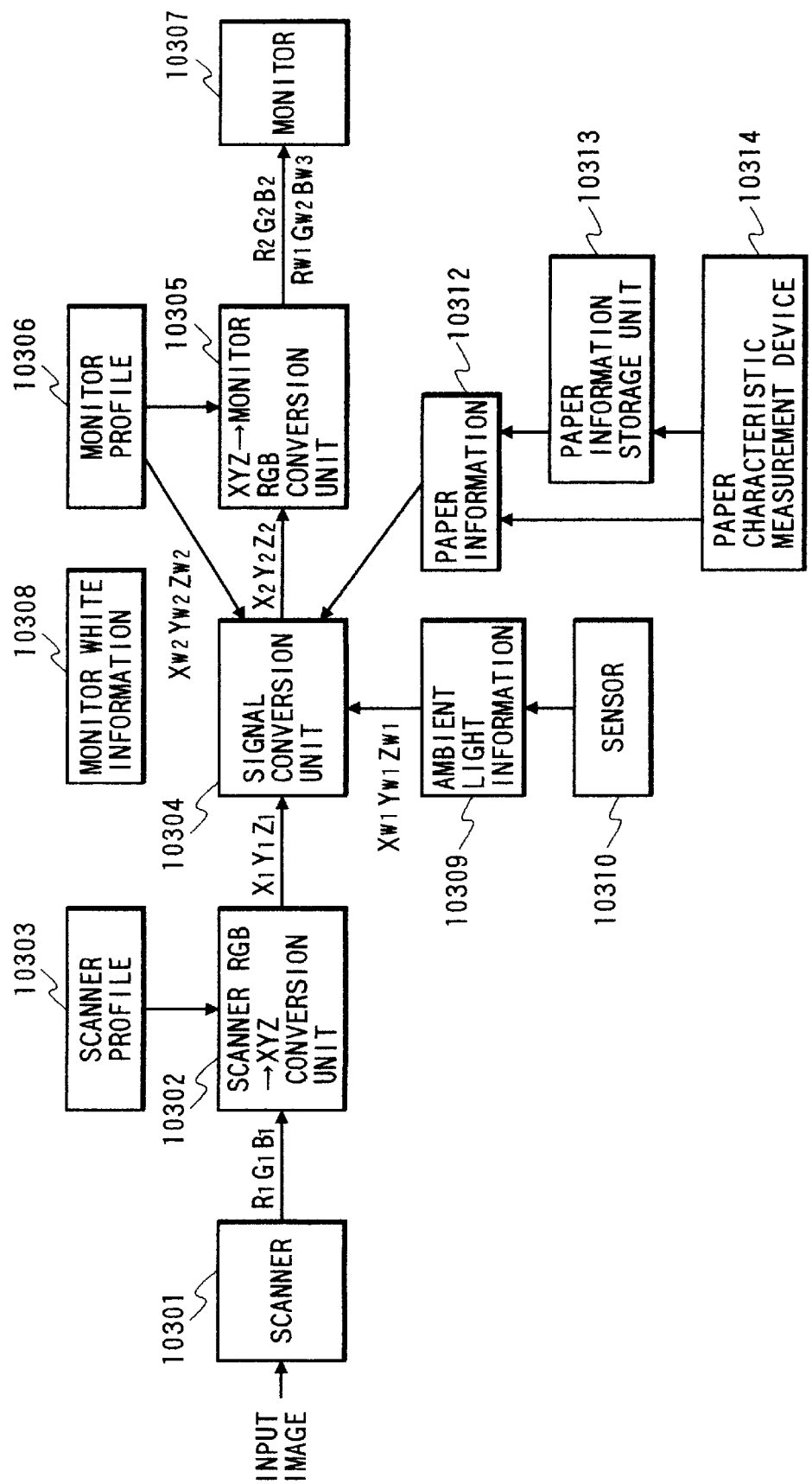
FIG. 5 is a block diagram showing a third embodiment of the present invention.

Further, it will be shown in FIG. 5 the third embodiment in which both a paper characteristic measurement device (i.e., color measurement device) 10314 and a paper information storage unit 10313 are provided as a part of a system. By applying such structure, paper information 10312 can be directly obtained from the color measurement device 10314, the color-measured paper information 10312 is once stored once in the paper information storage unit 10313 and thus can be repeatedly utilized, and the like. Therefore, it can cope with a paper of which characteristic has not been stored in the paper information storage unit 10313, a change in a paper characteristic and the like.

(Fourth Embodiment)

In the fourth embodiment, a function for sensing an ultraviolet (UV) component is added to the sensor 10310 shown in FIG. 1. Such function is obtained as a fourth sensor by preparing a sensor which has sensitivity in an UV range. Thus, tristimulus values $X_{WO}Y_{WO}Z_{WO}$ (representing white (color) in ambient light) and an UV component intensity value $UV_{WO}$ (i.e., output value of UV component sensor) are obtained as ambient light information. On the other hand, measuring is performed by using a device such as a spectrophotometer or the like, so as to obtain a 3×3 characteristic matrix $MTX_P$ (corresponding to the matrix $MTX_P$ in the second embodiment) as paper basic information a tristimulus value vector $(X_{UV}, Y_{UV}, Z_{UV})$ for a standard UV component intensity value as fluorescent whitening effect information, and an effect function $F_{UV}(UV)$ as a coefficient representing effect obtained by one UV component intensity value for such reference value. Then, they are inputted and stored in a paper information storage unit 10313. The tristimulus value vector $(X_{UV}, Y_{UV}, Z_{UV})$ for the standard UV component intensity value is obtained by subtracting, from tristimulus values $(X_{UV}', Y_{UV}', Z_{UV}')$ obtained by irradiating illumination light including the constant-intensity UV component onto the paper, tristimulus values $(X_{UV}'', Y_{UV}'', Z_{UV}'')$ obtained by irradiating onto the paper the illumination light from which the UV component is eliminated, as shown in the following equations.

$$X_{uv} = X_{uv}' - X_{uv}''$$

$$Y_{uv} = Y_{uv}' - Y_{uv}''$$

$$Z_{uv} = Z_{uv}' - Z_{uv}''$$

Further, the effect function $F_{UV}(UV)$ acting as the coefficient representing the effect obtained by one UV component intensity value for the reference value is obtained as follows. That is, the UV component intensity value in one illumination light is obtained by using the above-described UV component sensor. On the other hand, magnitude of the tristimulus value vector $(X_{UV}, Y_{UV}, Z_{UV})$ for the above-described standard UV component intensity value under such illumination light is obtained, and then the effect function $F_{UV}(UV)$ is obtained as ratio of such the magnitude to the standard UV component intensity value.

In the present embodiment, by using the above values, observation environment white $X_{W1}Y_{W1}Z_{W1}$ is obtained by a following equation.

$$\begin{bmatrix} X_{W1} \\ Y_{W1} \\ Z_{W1} \end{bmatrix} = MTX_P \begin{bmatrix} X_{WO} \\ Y_{WO} \\ Z_{WO} \end{bmatrix} + F_{UV}(UV_{WO}) \cdot \begin{bmatrix} X_{UV} \\ Y_{UV} \\ Z_{UV} \end{bmatrix}$$

Therefore, even if the paper or the like to be used includes a fluorescent whitening agent and the ambient light includes the UV component, the observation environment white and thus the standard white can be accurately obtained. Further, even in such case, color matching perception can be accurately obtained.

As one example, another structure according to the present embodiment will be described hereinafter. In the present embodiment, a spectral luminance meter which has sensitivity also in the UV component is used as the sensor 10310. By using such sensor 10310, visible light spectral intensity $R(\lambda)$ and the UV component intensity value $UV_{WO}$ are obtained as the ambient light information. On the other hand, by the measuring of the spectrophotometer or the like, a spectral reflectance $P(\lambda)$ of the paper from which the fluorescent whitening component is eliminated, a spectral intensity factor $P_{UV}(\lambda)$ of the fluorescent whitening component and its effect function $F_{UV}(UV)$ are obtained as the paper information and then stored in the paper information storage unit 10313. Subsequently, by using these values, the tristimulus values $X_{W1}, Y_{W1}, Z_{W1}$ of the observation environment white are obtained in the following equations.

$$X_{W1} = \int (R(\lambda) \cdot P(\lambda) + F_{UV}(UV_{WO}) \cdot P_{UV}(\lambda)) \cdot \bar{x}(\lambda) d\lambda$$

$$Y_{W1} = \int (R(\lambda) \cdot P(\lambda) + F_{UV}(UV_{WO}) \cdot P_{UV}(\lambda)) \cdot \bar{y}(\lambda) d\lambda$$

$$Z_{W1} = \int (R(\lambda) \cdot P(\lambda) + F_{UV}(UV_{WO}) \cdot P_{UV}(\lambda)) \cdot \bar{z}(\lambda) d\lambda$$

By using spectral data, the observation environment white can be accurately obtained.

As described above, by adding such parameters as above to the illumination light information or the paper information, even if the paper or the like to be used includes the fluorescent whitening agent and the ambient light includes the UV component, the observation environment white and thus the standard white can be accurately obtained. Further, even in such the case, the color matching perception can be accurately obtained.

As can be seen in the above-described embodiments, in the present invention, if there are many colors capable of being perceived as the whites in the observation environment, the reference white is obtained by collecting these whites, and the color signal process is performed by using the obtained reference white such that the color appearance of the displayed image on the monitor becomes identical with the color appearance of the image on the printed matter. In such operation, the subject matter or the main point of the present invention is to provide the means for obtaining the reference white as the white (i.e., paper white) to be perceived on the printed matter is sufficiently considered. More particularly, the main point of the present invention is that, by using the information (i.e., chromaticity value, spectral reflectance or the like) as to the paper from which the printed matter (hard copy) is obtained, from the information (i.e., chromaticity value, color temperature or spectral intensity (intensity of illumination)) as to the illumination light (i.e., environment light), the information (i.e., chromaticity value, XYZ tristimulus values and the like) as to the white (i.e., paper white under such illumination light) which is perceived on the printed matter illuminated by such illumination light (i.e., environment light) is obtained, and then the reference white is obtained by using the paper white and the monitor white under such illumination light.

For this reason, as the system, the main point of the present invention is to further add the means for obtaining the information (i.e., chromaticity value or spectral reflectance) as to the paper from which the printed matter (hard copy) is obtained; the storage means for storing the obtained information; and the means for obtaining, from the information as to the paper from which the printed matter (hard copy) is obtained which information has been stored in the storage means or is obtained from the obtaining means and from the information as to the illumination light (i.e., environment light) obtained from the illumination light (environment light) measurement means, the information as to the white of the paper illuminated by such the illumination light.

Therefore, within a scope which does not exceed the main point or the subject matter of the present invention, various hardware structure and their corresponding sequence processes can be conceived. For example, these sequence processes make a logic, a software or an algorithm within the scope not exceeding the present invention. Thus, according to this algorithm, these sequence processes are applicable to a hardware or a device.

Further, the color signal conversion method according to the present embodiment is applicable to a copy machine or a printer which has a preview function for previously displaying the copied or printed image on monitor. Furthermore, such the color signal conversion method can be used in color signal converting of various input/output equipment as a color management system process method. That is, such color signal conversion method is applicable to an image processing device which performs the color signal converting in various cases.

(Fifth Embodiment)

Figure 8:
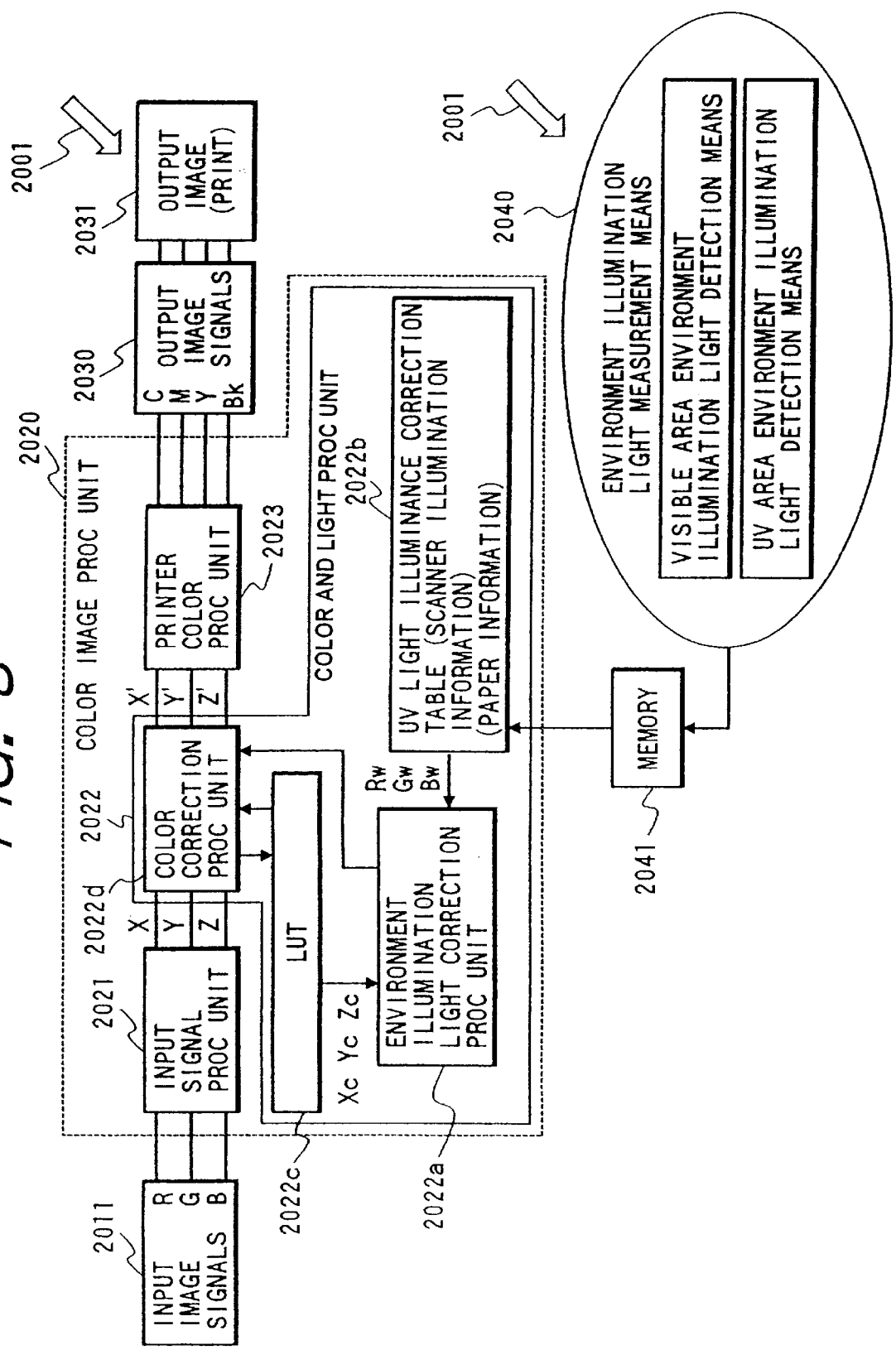
FIG. 8 is a block diagram showing structure according to a fifth embodiment of the present invention.

FIG. 8 is a block diagram showing an example of the structure of a color image processing apparatus according to the fifth embodiment of the present invention.

Reference numeral 2001 denotes environment illumination light for illuminating an output image (i.e., print). Reference numeral 2011 denotes input image signals, e.g., R, G and B signals in NTSC (National Television System Committee) system which are obtained under standard illumination light.

Reference numeral 2020 denotes a color image process unit which processes the image signal to generate a signal suitable for outputting. The color image process unit 2020 is composed of an input signal process unit 2021 which performs density correcting and gamma correcting on the input image signal by using correction parameters to convert the input image signal into chromaticity signals X, Y and Z, a color correction process unit 2022d which performs optimum correcting on the chromaticity signals on the basis of environment illumination light information or the like, and a printer color process unit 2023 which converts color-corrected chromaticity signals X', Y' and Z' into C, M, Y and Bk signals 2030 suitable for printer outputting. These units are all controlled by a CPU (not shown).

On the basis of the C, M, Y and Bk signals 2030, a printer unit forms an output image 2031 on a recording medium by using a recording agent of each of C, M, Y and Bk colors.

A color and light process unit 2022d is composed of the color correction process unit 2022d of a look-up table 2022c which performs a color matching process corresponding to the standard illumination light, an ultraviolet (UV) light illuminance correction table 2022b which obtains a correction amount signal from UV-range illuminance, output paper information, scanner information and the like, and an environment illumination light correction process unit 2022a which performs an environment illumination light correction process as it takes into consideration fluorescent whitening effect according to the recording medium and the environment illumination light.

Figure 9:
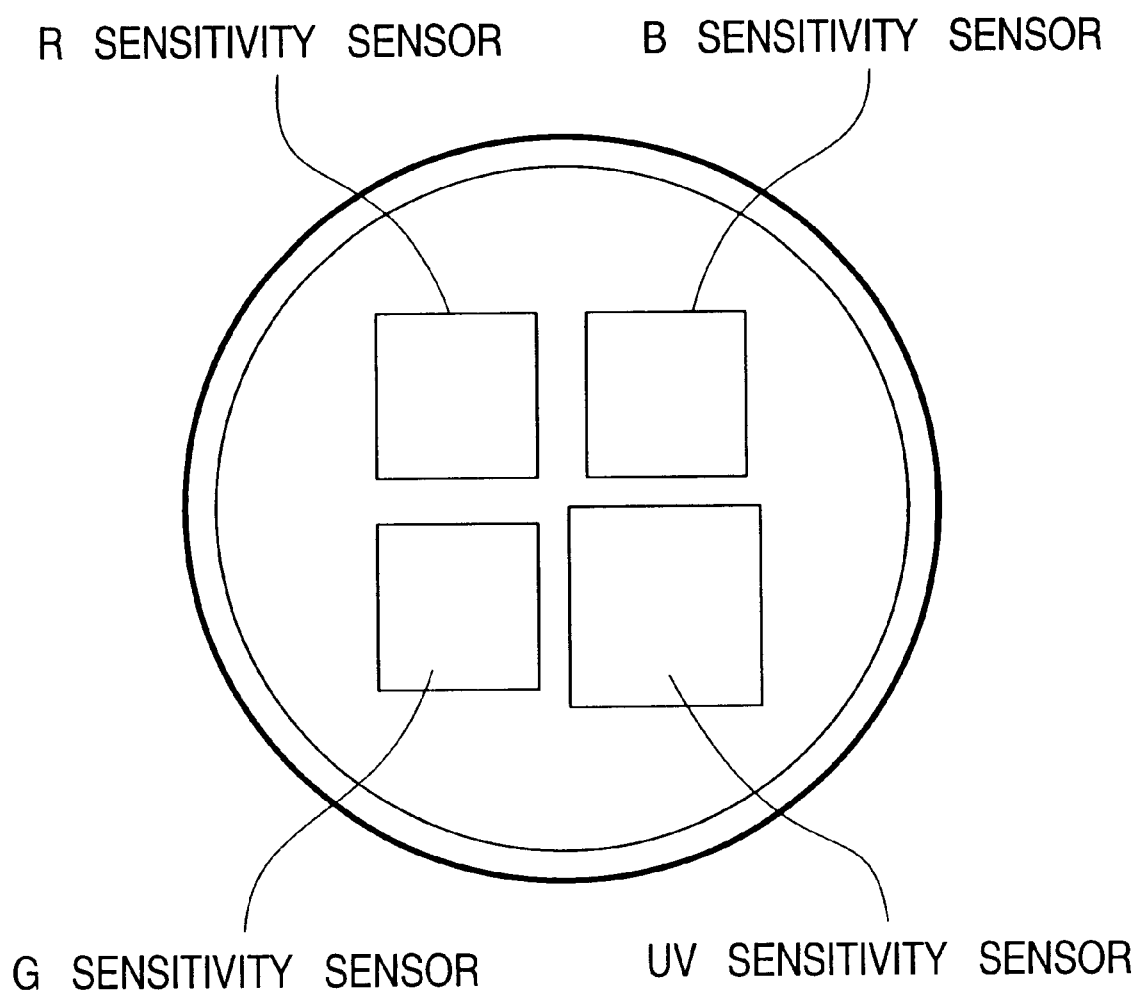
FIG. 9 is a view showing structure of a sensor unit of an environment illumination light detection means.
Figure 10:
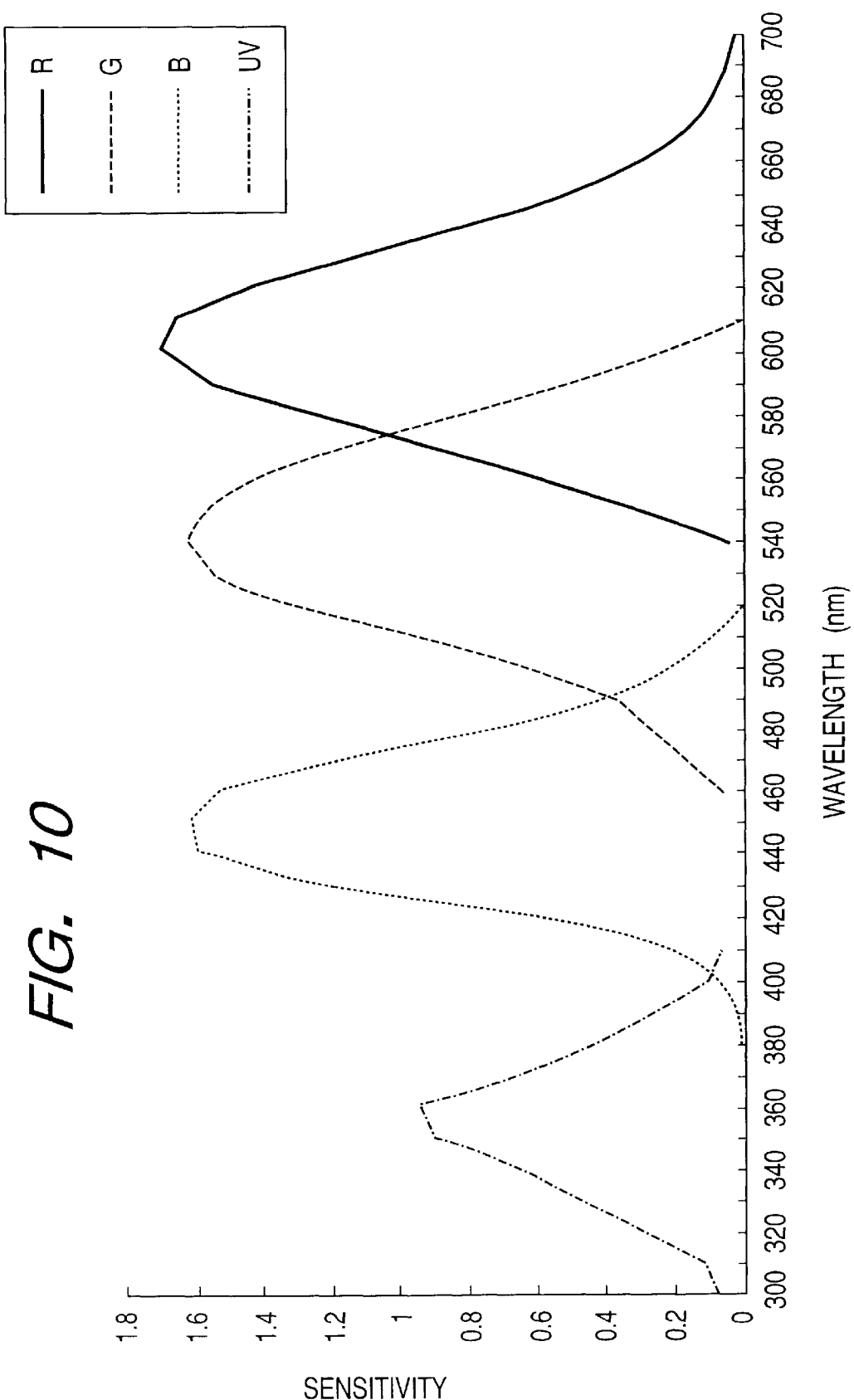
FIG. 10 is a view showing spectral sensitivity of the environment illumination light detection means.

Reference numeral 2040 denotes an environment illumination light detection means which detects the environment illumination light 2001 under which printed matter 2031 is observed and can store a chromaticity value and brightness data into a memory 2041. The environment illumination light measurement means 2040 has a light reception unit having such arrangement as shown in FIG. 9. The light reception unit receives light selected by a silicon photocell and a filter so as to measure visible-range three primary colors R (red), G (green) and B (blue) and an UV range. FIG. 10 shows graphs respectively representing rough values of spectral sensitivity of R, G, B and UV sensors of the light reception unit.

Operation of the color image processing apparatus according to the present embodiment will be explained hereinafter with reference to FIG. 8. The input signals 2011 are inputted in the form of R, G and B signals obtained under the standard illumination light, and then subjected to the density correcting and the gamma correcting in the input signal process unit 2020 to be converted into the chromaticity signals X, Y and Z.

Subsequently, the environment illumination light which is the illumination light at the time of observing is assumed as standard UV-range illumination light, and the look-up table 2022c performs the color matching process on the basis of difference in color reproduction gamuts between input and output devices or the like to convert these signals into chromaticity signals $X_C$, $Y_C$ and $Z_C$. In the look-up table 2022c, data corresponding to a plurality of groups of input/output devices have been stored as profile data. Then, a look-up table of the profile data corresponding to the input device of the input image signal is provided in the look-up table 2022c, by a CPU (not shown).

On the other hand, the environment illumination measurement means 2040 measures the environment illumination light 2001 under which the printed matter 2031 is observed and stores the measured data in the memory 2041. Therefore, the CPU (not shown) sends to the environment illumination light correction process unit 2022a three primary colors $R_W$, $G_W$ and $B_W$ signals from an UV-range illuminance correspondence table which has been previously obtained in experiment, in accordance with measured UV-range intensity and visible-range intensity and recording medium information (i.e., paper information). The $R_W$, $G_W$ and $B_W$ signals represent the reference white data used when observing the output image.

It is considered that fluorescence of paper is affected by the UV-range illumination intensity of the environment illumination light and the reference white point varies according to the illumination, and thus the environment illumination light correction process unit 2022a performs a correction process on the chromaticity signals $X_C$, $Y_C$ and $Z_C$ outputted from the look-up table 2022c, by using a Von Kries color adaptation prediction equation.

If values to be corrected of the printed matter illuminated with the UV-range intensity different from standard one are tristimulus values X'Y'Z', these values can be expressed by the Von Kries equation as follows.

$$\begin{bmatrix} X' \\ Y' \\ Z' \end{bmatrix} = (M)^{-1}(D)(M) \begin{bmatrix} X_c \\ Y_c \\ Z_c \end{bmatrix}$$

In this case, three primary colors CRCGCB are obtained on the basis of tristimulus values $C_x C_y C_z$ of a print (paper) white point which is obtained in a case where the standard UV-range illumination light is identical with the environment illumination light. Reference symbol (M) denotes a constant which can be represented by a 3×3 matrix defined from the tristimulus values $C_x C_y C_z$ (i.e., basic primary colors), and reference symbol (D) denotes a shift amount of the white point. (D) can be represented as follows.

$$(D) = \begin{bmatrix} Rk & 0 & 0 \\ 0 & Gk & 0 \\ 0 & 0 & Bk \end{bmatrix}$$

where Rk=RW/CR, Gk=GW/CG and Bk=BW/CB.

By adding such amendments as above, the fluorescent whitening effect is compensated if the UV-range illumination light amount is smaller than the standard illumination light amount, and the fluorescent whitening effect is reduced if the UV-range illumination light amount is larger than the standard illumination light amount.

The tristimulus value signals X', Y' and Z' corrected by the color correction unit are converted by the printer color process unit 2023 into the C, M, Y and Bk signals 2030 suitable for the printer outputting, by using a known method. Thus, the printed matter 2031 can be obtained as the output image.

(Sixth Embodiment)

Figure 11:
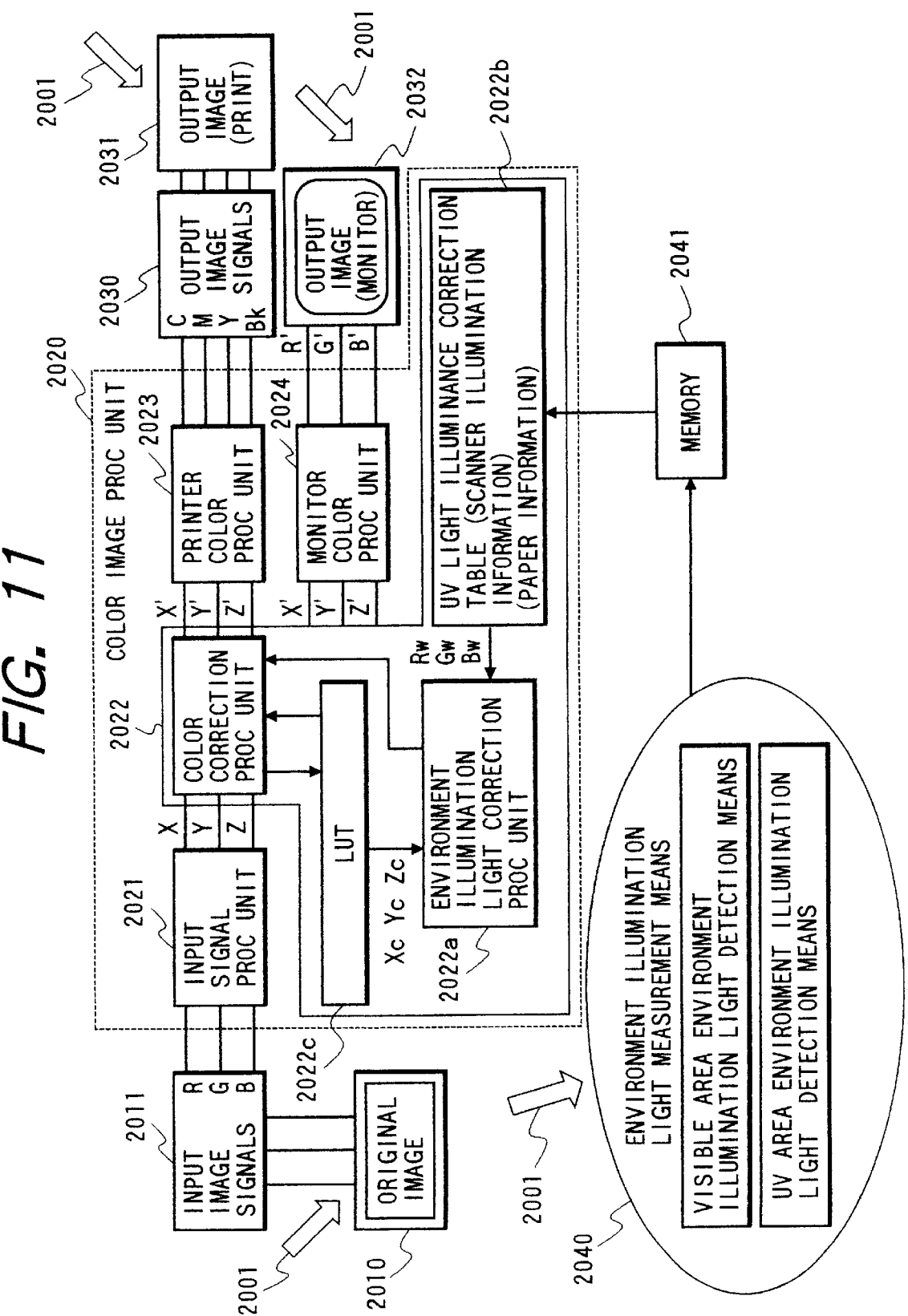
FIG. 11 is a block diagram showing structure according to a six embodiment of the present invention.
Figure 12:
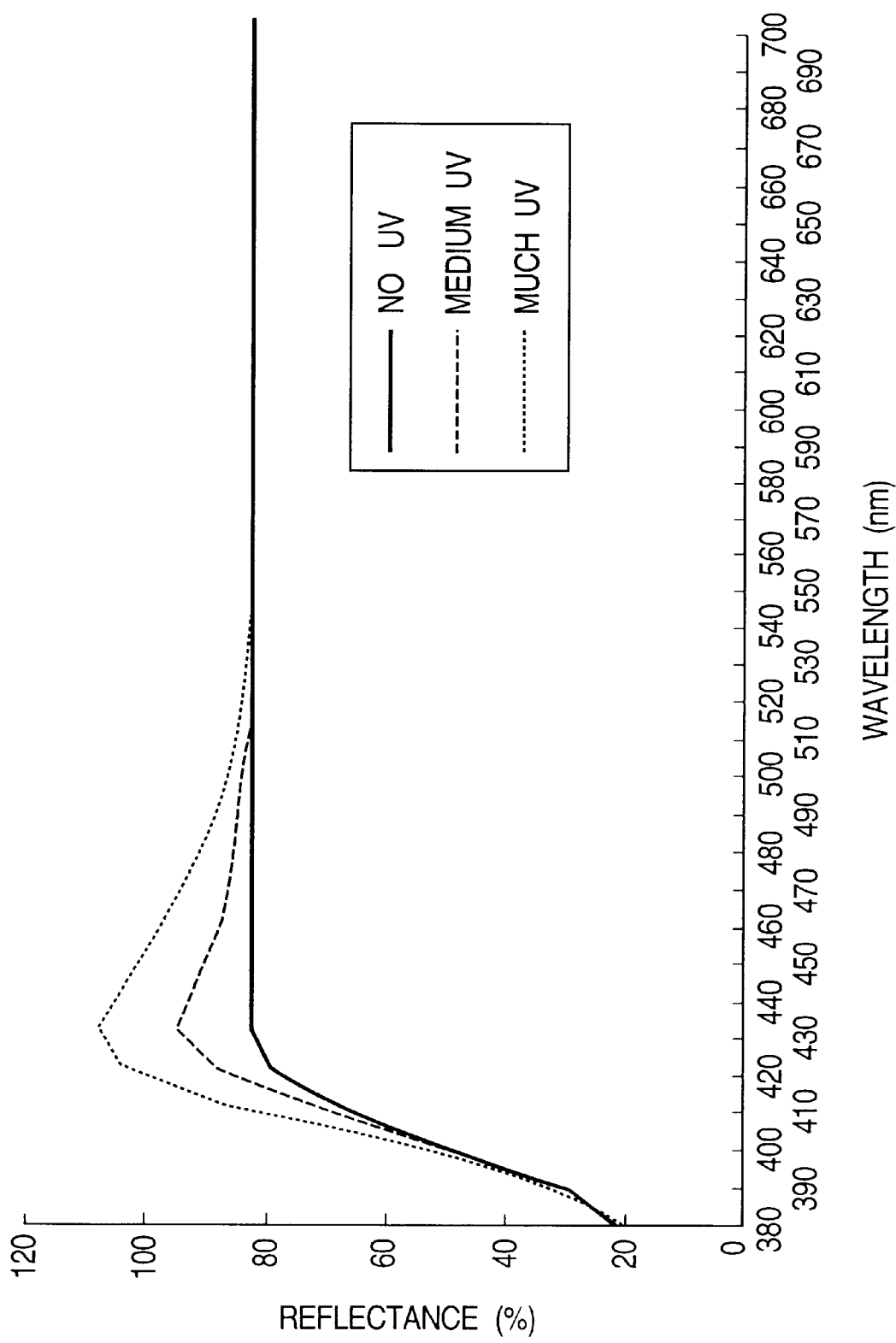
FIG. 12 is a view showing reflectance of a paper based on UV-range (ultraviolet-range) illumination intensity.

FIG. 11 shows a block structure example in which an apparatus for putting an image into a computer, displaying the put image on a display such as a CRT or the like and then outputting the displayed image is utilized as a preview apparatus for performing adjusting such that a color of the image on an original becomes identical with a color of the image on the CRT. In FIG. 11, the components added with the same reference numerals as those in FIG. 8 have the same functions as those explained in the fifth embodiment. Therefore, only the components of which numerals are not mentioned in the fifth embodiment will be explained hereinafter. That is, reference numeral 2010 denotes an original image which is illuminated by environment illumination light 2001. Also, a monitor 2032 for outputting and displaying a color image to be reproduced on printed matter and a print 2031 are illuminated by the environment illumination light 2001. Further, a monitor color process unit 2024 which performs the color converting for the monitor 2032 is provided in a color image process unit 2020.

Hereinafter, operation of the sixth embodiment will be explained with reference to FIG. 11. Initially, R, G and B image signals 2011 which were obtained by reading the original image 2010 with a scanner or the like under standard illumination are inputted into an input signal process unit 2021. Then, these signals are subjected to density correcting and gamma correcting by using known methods, and converted into chromaticity signals X, Y and Z. At this time, illumination information of the scanner is stored in an UV light illuminance correspondence table of a color correction process unit 2022d.

Further, the signals X, Y and Z are generated under standard UV-range illumination light, e.g., a C light source, which was used to form a matrix in the color correction process unit 2022d. Furthermore, the same condition is assumed for environment illumination light under which observing is performed, whereby a color reproduction gamut or the like is corrected by using a look-up table 2022c to generate chromaticity signals $X_C$, $Y_C$ and $Z_C$.

On the other hand, an environment light illumination measurement means 2040 detects the environment illumination light 2001 by which the printed matter 2031 and the original image 2010 are illuminated, and stores data obtained by the detecting in a memory 2041. Therefore, in accordance with detected UV-range intensity and visible-range intensity, a CPU (not shown) sends to an environment illumination light correction process unit 2022a three-primary-color RWGWBW signals of white data to be corrected based on the scanner illumination information and paper information, from an UV-range illumination correspondence table which has been previously obtained from experiment. The environment illumination light correction process unit 2022a compares these signals with the scanner illumination information to judge whether the above three-primary-color correction value is appropriate or not. If not, the correcting explained in the fifth embodiment is performed. Corrected tristimulus value signals X', Y' and Z' are converted by a printer color process unit 2023 into C, M, Y and Bk signals 2030 suitable for printer outputting, and converted by a monitor color process unit 2024 into R', G' and B' signals optimum for monitor displaying. These converting are performed by using known methods, and the printed matter 2031 and the monitor image 2032 can be obtained as the output images.

As described above, according to the present embodiment, even if the standard illumination light under which profile data is produced is different from the environment illumination light under which the observing is performed, the environment illumination light according to changes in the UV and visible ranges is measured by the environment illumination light measurement means, and the color correcting according to the environment illumination light is performed by a color correction means. Therefore, the reproduction color forming can be accurately and effectively realized even in the printed matter having different fluorescent whitening (white) effect, a previewer using the CRT, or the like.

(Seventh Embodiment)

Figure 13:
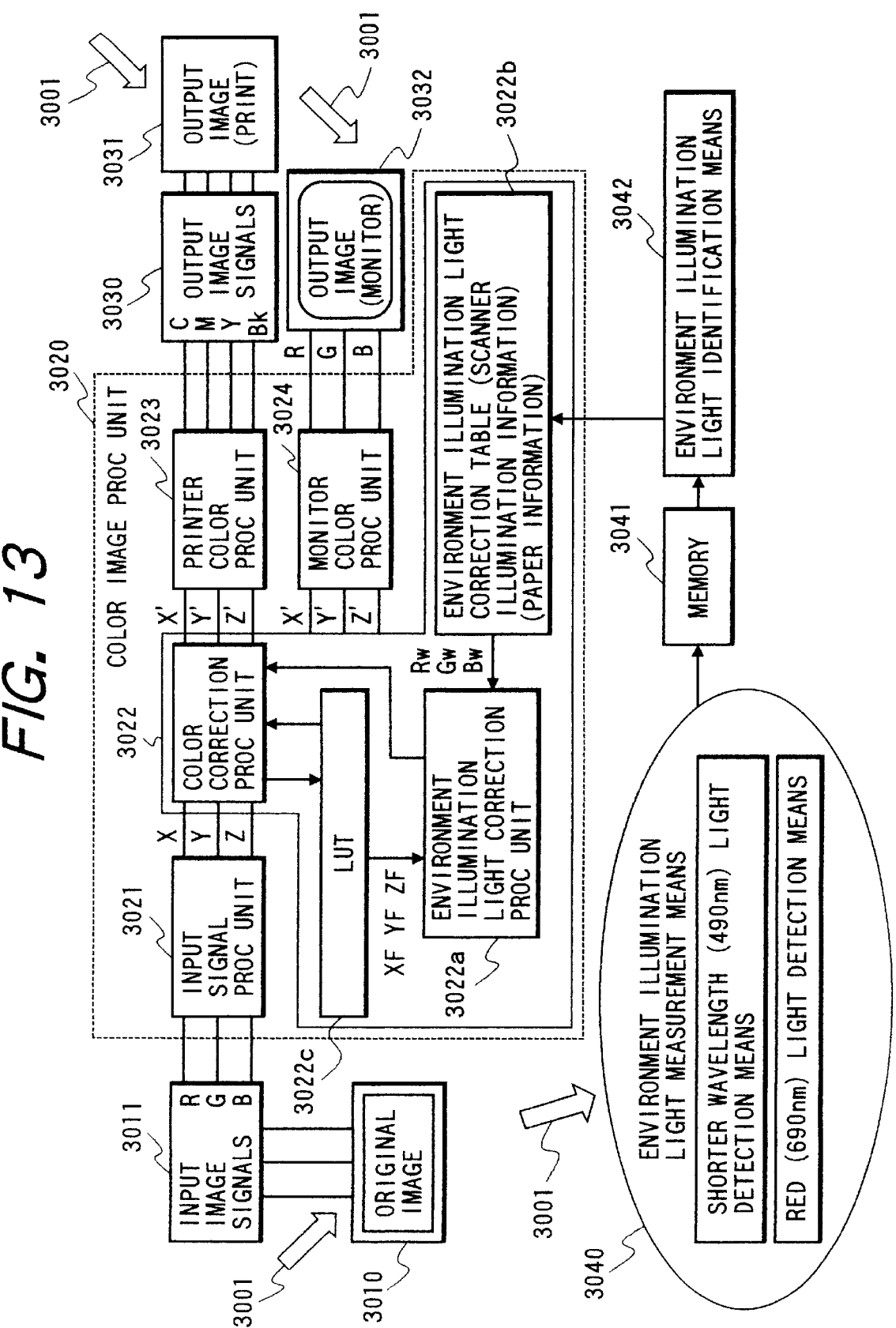
FIG. 13 is a block diagram showing structure according to a seventh embodiment of the present invention.

FIG. 13 is a block diagram showing an image processing apparatus according to the seventh embodiment of the present invention. In the present embodiment, image input/output structure is utilized in case of inputting image data and outputting it to a printer or a monitor.

Figure 15:
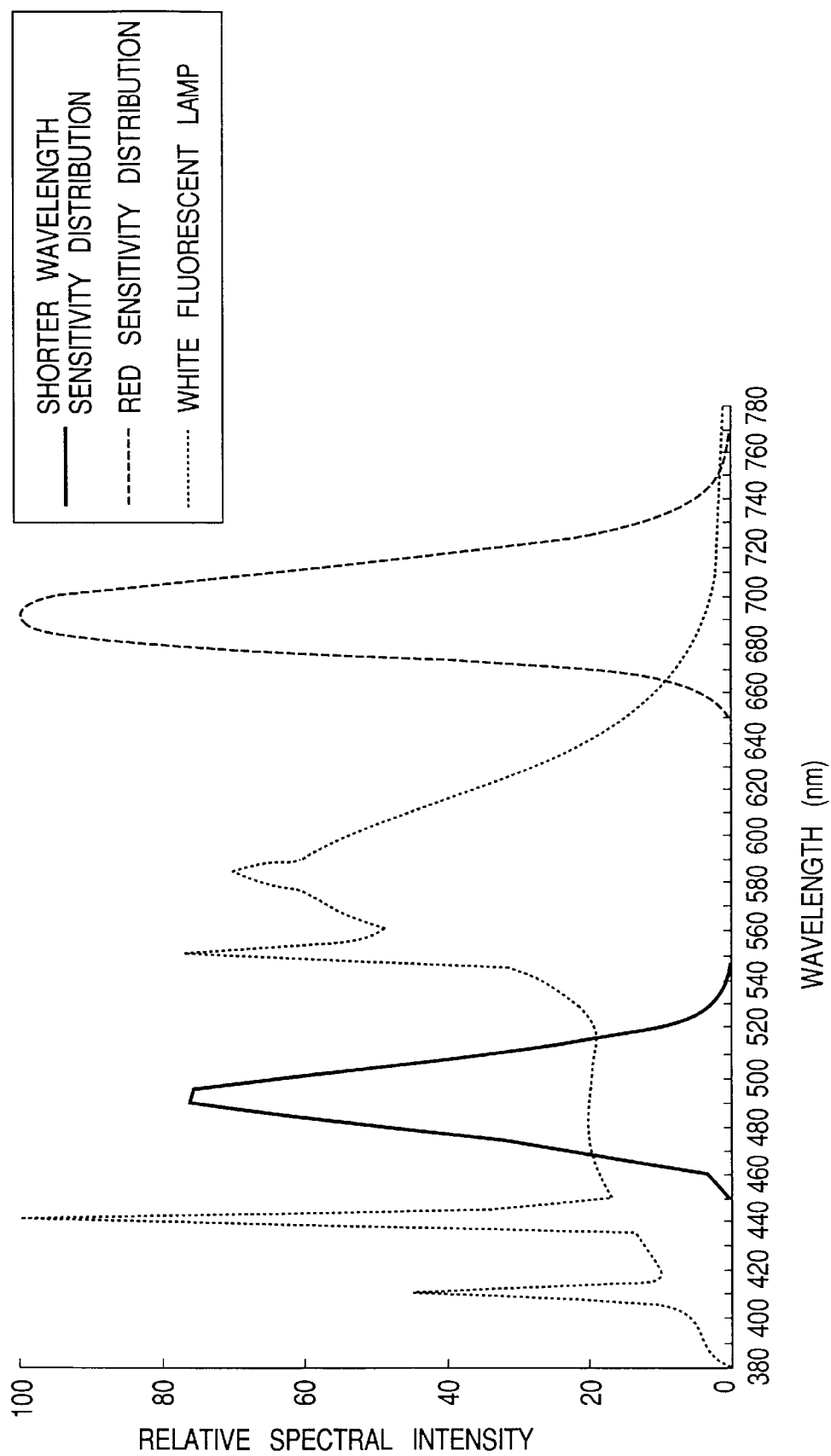
FIG. 15 is a view showing relative spectral intensity of fluorescent light and spectral sensitivity of the environment light measurement means.
Figure 16:
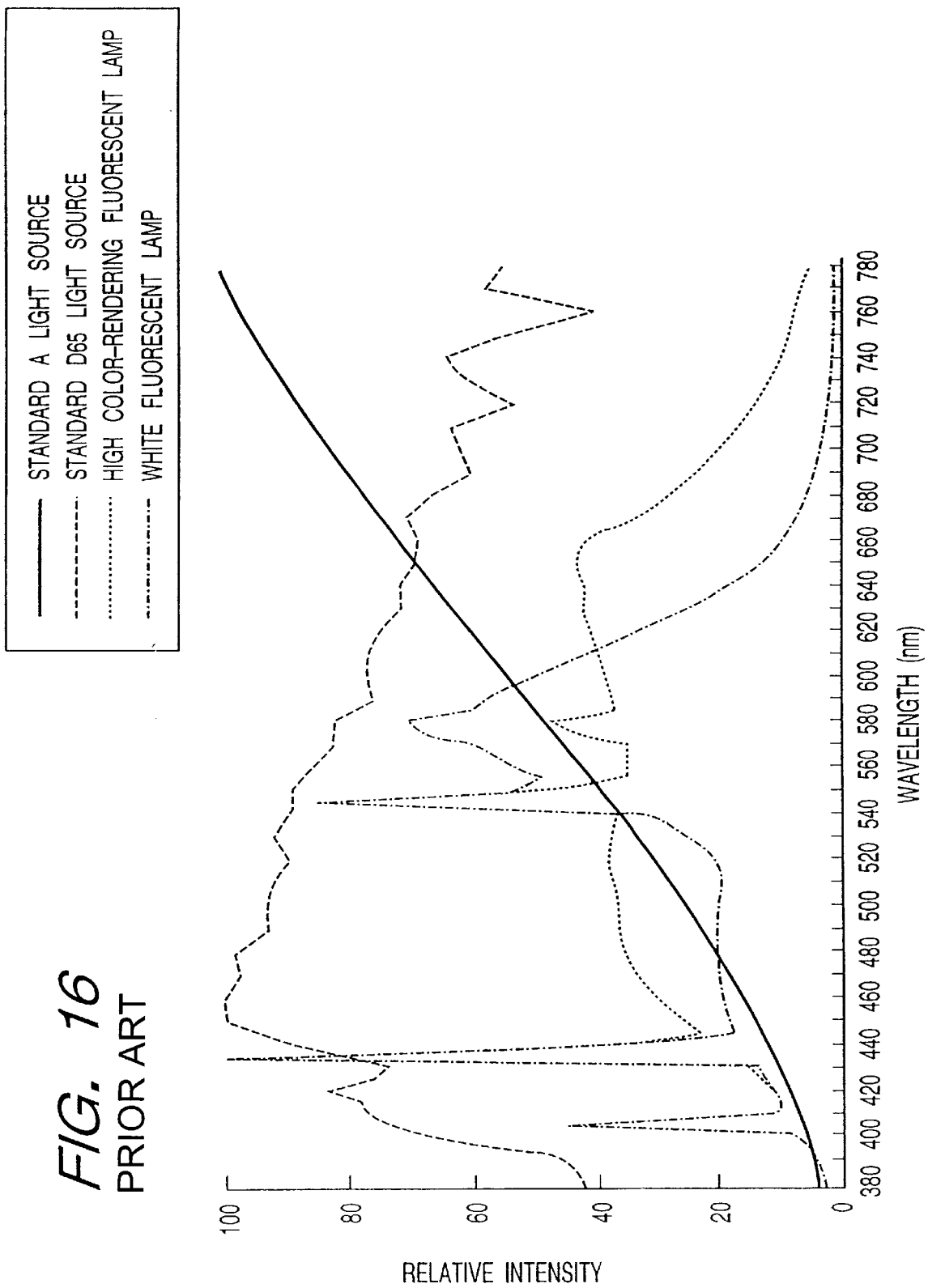
FIG. 16 is a view showing standard illumination light.

Reference numeral 3001 denotes environment illumination light which mainly includes fluorescent light, has such a spectral intensity distribution as shown in FIG. 15, and illuminates an original image 3010, a print (output image) 3031 and an output monitor 3032. Reference numeral 3011 denotes input image signals which can be obtained under standard illumination light as, e.g., R, G and B signals in NTSC system. Reference numeral 3020 denotes a color image process unit which processes the image signal to generate a signal suitable for outputting under the fluorescent light. The color image process unit 3020 performs density correcting and gamma correcting on an input signal by using correction parameters based on characteristics of the input image signals. The unit 3020 is composed of an input signal process unit 3021 which converts the image signals into chromaticity signals X, Y and Z, a color correction process unit 3022 which performs optimum correcting on the chromaticity signals with adding of environment illumination light information or the like, a printer color process unit 3023 which converts color-corrected signals X', Y' and Z' into C, M, Y and Bk signals 3030 suitable for printer outputting, and a monitor color process unit 3024 which converts the signals X', Y' and Z' into R, G and B signals suitable for monitor outputting, and the like. The entire color image process unit 3020 is controlled by a CPU (not shown). The C, M, Y and Bk signals 3030 are outputted by a printer unit (not shown) as an output image to obtain the printed matter 3031, and the R, G and B signals are outputted and displayed on the monitor 3032 such as a CRT or the like.

The color correction process unit 3022 is composed of an environment illumination light correction process unit 3022a which performs correcting based on environment illumination light different from the standard illumination light, an environment illumination light correction table 3022b which generates a correction amount signal from an environment illumination light identification means 3042, scanner illumination information or the like, and a look-up table 3022c which performs color correcting depending on the standard illumination light. Reference numeral 3040 denotes as environment illumination light measurement means which detects the environment illumination light 3001 under which the printed matter 3031 and the monitor 3032 are observed and can store a chromaticity value and lightness data in a memory 3041.

Figure 14A:
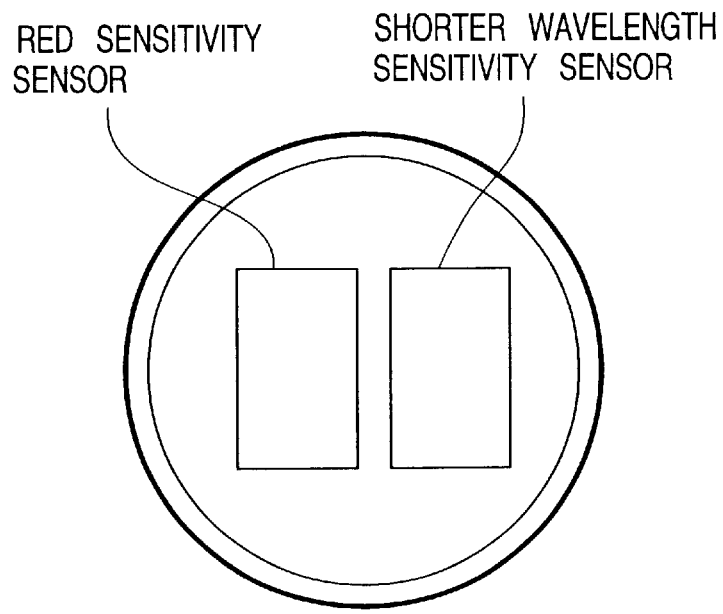
FIGS. 14A and 14B are views showing a sensor portion of an environment light measurement means and relative spectral sensitivity thereof.
Figure 14B:
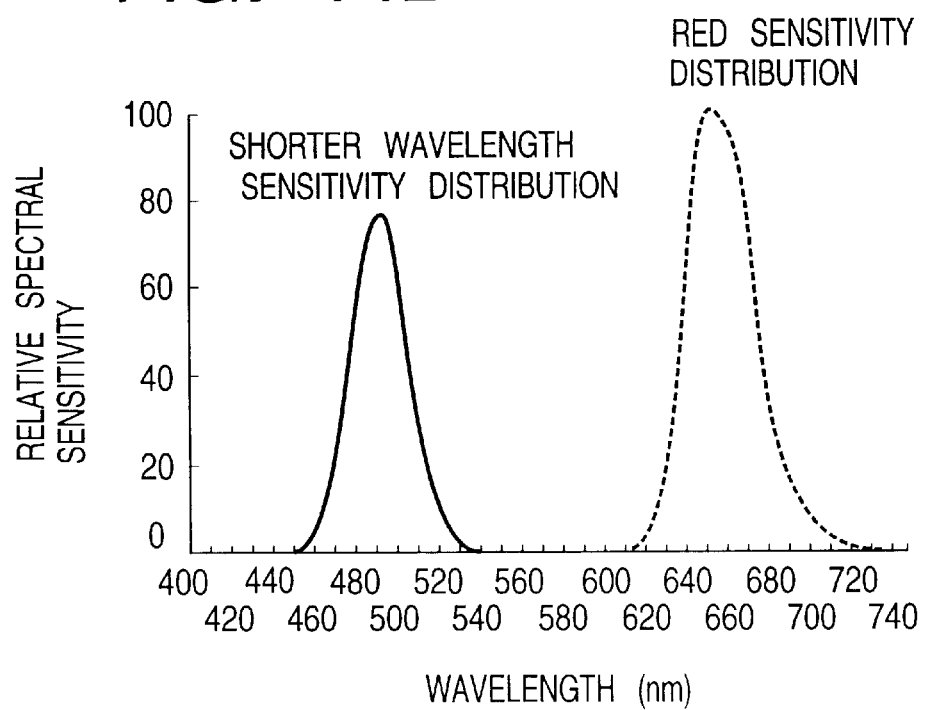

The environment illumination light measurement means 3040 has a light reception unit which has such arrangement as shown in FIG. 14A for receiving light selected by a silicon photocell and a filter and has such a spectral sensitivity characteristic as shown in FIG. 14B. That is, the environment illumination light measurement means 3040 has a light detection means having maximum sensitivity at wavelength 490 nm other than a main luminescent line of the fluorescent light and a light detection means having maximum sensitivity at red wavelength 690 nm. By such structure, a change in the illumination light from which strong influence of luminescent line is eliminated can be measured with an excellent SN (signal-noise) ratio.

Figure 17:
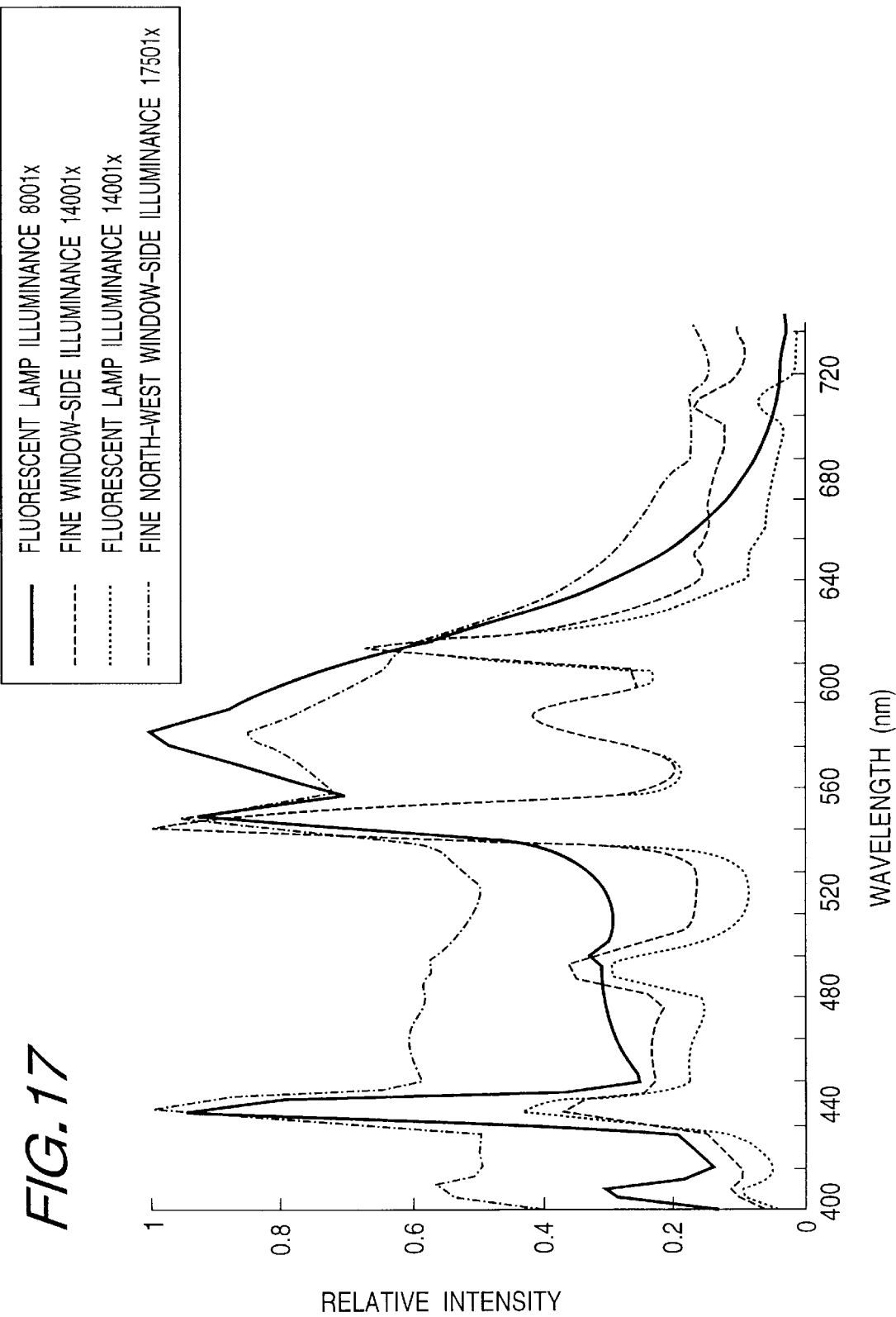
FIG. 17 is a view showing an example of relative spectral intensity in a case where the fluorescent light and external light are mixed.
Figure 18:
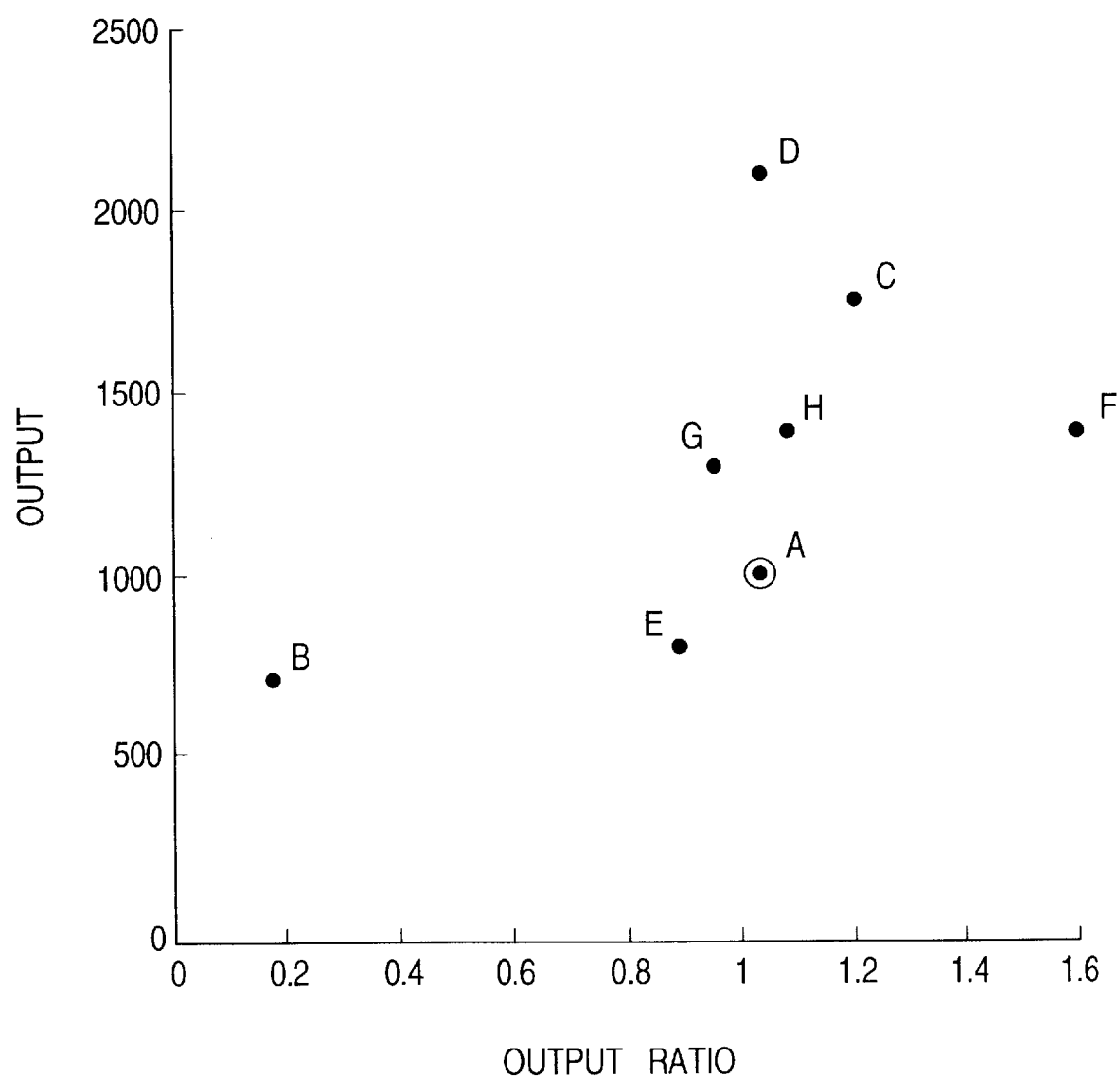
FIG. 18 is a view in which outputs from an environment illumination light measurement means and their output ratio are plotted with respect to various light sources.
Figure 19:
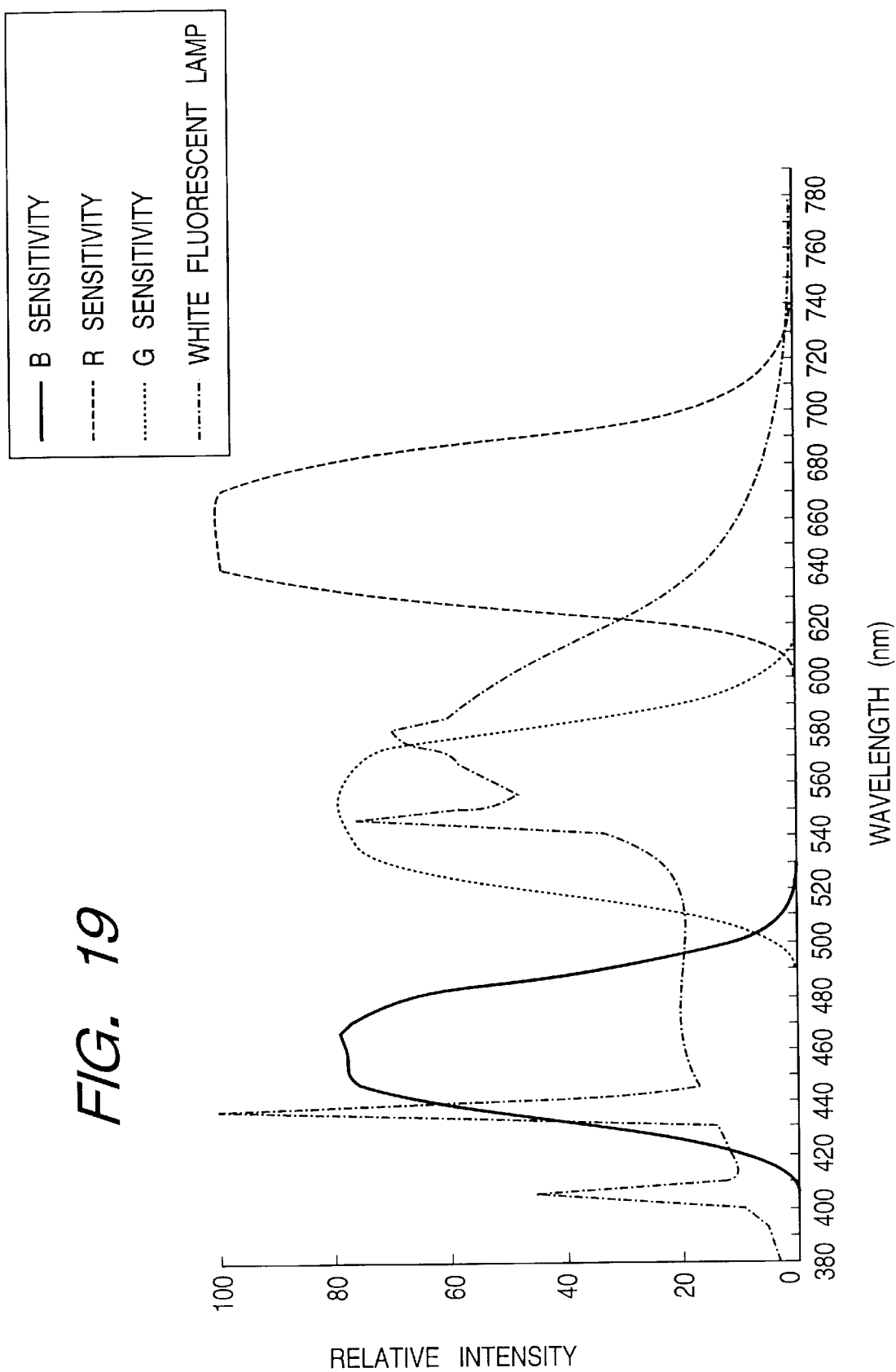
FIG. 19 is a view showing an example of the relative spectral intensity of the fluorescent light and spectral sensitivity of a conventional environment light measurement means.

How to identify an illumination light source will be explained hereinafter. Since red light intensity and shorter-wavelength light intensity included in the illumination light highly change in accordance with the illumination light source as shown in FIGS. 15 and 17, after a red output and an output other than the red output are measured, the ratio thereof is calculated. Further, as lightness of the illumination light or the like is added, the calculated data is compared with light source data previously stored in a memory. FIG. 18 is a view in which outputs from the environment illumination light measurement means 3040 and their output ratio are plotted in accordance with changes in the environment light. In FIG. 18, an axis of ordinate represents total outputs from the two light detection means, and an axis of abscissa represents the output ratio of the outputs from the light detection means having the sensitivity at red to the shorter-wavelength light detection means. A plot point A represents a value in the case where the reference illumination light is white fluorescent light.

On basis of such the value, if the measured result is plotted as a point B, the environment illumination light identification means 3042 judges that the light source is an incandescent lamp since the output of the shorter wavelength is small. Further, if the measured result is plotted as a point F, the means 3042 judges that the light source is a fluorescent lamp since the red output is small and lightness is also considered. Similarly, if a point D, the light source is judged as daylight since the output and lightness are large. If points C, G and H, the light source is judged as the fluorescent light including external light (daylight) since lightness is slightly large. In this case, according to ratio, the means 3042 judges as afternoon (point G) and blue sky (point C). If a point E, the light source is judged as the old fluorescent lamp or the like since there is a dark and reddish color.

Subsequently, operation of the present embodiment will explained hereinafter with reference to FIG. 13. Initially, the original image 3010 is read by a scanner (not shown). As the input image signals 3011 obtained under the standard illumination light, the R, G and B signals are inputted to the input signal process unit 3021 and converted into the chromaticity signals X, Y and Z through the density correcting and the gamma correcting in the known method.

Further, these signals are subjected to a color matching process to be converted into chromaticity signals XF, YF and ZF by using the look-up table 3022c based on the matrix corresponding to the standard illumination light. Such color matching process is performed by selecting, from among a plurality of previously stored profiles, the profile corresponding to the output device and by using a look-up table in the selected profile. It should be noted that the profile has been previously stored in a RAM (not shown), and the profile selecting and the look-up table setting to the look-up table 3022c are performed by the CPU (not shown).

According to this color matching process, the color correcting which took into consideration the difference in color reproduction gamut between input and output devices can be performed.

On the other hand, since the environment illumination light measurement means 3040 measures the environment illumination light 3001 under which the printed matter 3031 is observed and stores the measured data, the CPU (not shown) causes the environment illumination light identification means 3042 to identify the light source in accordance with measured environment illumination light information. Then, the CPU sends, from the environment illumination light correction table 3022b previously obtained in experiment, three-primary-color RWGWBW signals of the white data to be corrected and corresponding to the identified light source to the environment illumination light correction process unit 3022a, such that these signals can be used in the correcting.

It is considered that the reference white point varies according to the illumination light. Thus, the environment illumination light correction process is performed by using, e.g., the Von Kries color adaptation prediction equation as follows.

$$\begin{bmatrix} X' \\ Y' \\ Z' \end{bmatrix} = (M)^{-1}(D)(M) \begin{bmatrix} XF \\ YF \\ ZF \end{bmatrix}$$

In the equation, reference symbol (M) denotes a constant which can be represented by a 3×3 matrix defined from the basic primary color, and reference symbol (D) denotes a shift amount of the white point which can be represented as follows.

$$(D) = \begin{bmatrix} Rk & 0 & 0 \\ 0 & Gk & 0 \\ 0 & 0 & Bk \end{bmatrix}$$

where Rk=RW/FR, Gk=GW/FG and Bk=BW/FB, and the three primary colors FRFGFB can be obtained from tristimulus values FX, FY and FZ representing the print paper or the monitor white point under the standard illumination light.

According to the environment illumination light correction process, the chromaticity signals XF, YF and ZF depending on the standard light source can be corrected to the tristimulus value signals X', Y' and Z' color-adapted to the illumination light different from the standard light source.

That is, in the environment illumination light correction process, the light source is corrected to coincide with the environment illumination light which was reproduced as the color different from the standard illumination light and thus varies.

Of course, the matter (or image) of which density (lightness) exceeds an output gamut can be further corrected in a known method.

If the measured environment illumination light is identical with the standard illumination light, the output from the look-up table 3022c is sent to the printer color process unit 3023 as the corrected tristimulus value signals X', Y' and Z' under the control of the CPU (not shown).

Then, the tristimulus value signals X', Y' and Z' corrected by the color correction process unit 3022 are converted by the printer color process unit 3023 into the C, M, Y and Bk signals 3030 suitable for the printer outputting, and converted by the monitor color process unit 3024 into the R', G' and B' signals optimum for the monitor displaying. These converting are respectively performed by known methods, and thus the printed matter 3031 and the monitor image can be obtained as the output images.

In the color image processing apparatus to which the above structure is applied, since the intensity of the illumination light from which the luminescent line was eliminated is measured by the environment illumination light measurement means having the sensitivity at the wavelength other than the main luminescent line of the fluorescent light, even if the other illumination light is mixed to the fluorescent light and thus the fluorescent light varies, the environment illumination light output can be accurately obtained. Further, in the environment illumination light identification means, the change in reference environment illumination light can be grasped from the ratio of the longer-wavelength output of the environment illumination light and the shorter-wavelength light output from which the fluorescent light luminescent line was eliminated, so that the kind of the illumination light can be identified.

Furthermore, even if the standard illumination light under which the profile data was generated is different from the environment illumination light for the observing, the environment illumination light according to the change in illumination light can be measured by the environment illumination light measurement means, and the color correcting according to the environment illumination light can be performed by the color correction means, so that the reproduction color can be accurately formed even in the printed matter, the previewer using the CRT, or the like. Furthermore, since only two colors may be measured as the environment illumination light measuring, the entire measurement structure can be simplified and thus an advantage in cost can be obtained.

In the above-described embodiment, the environment illumination light measurement means is composed of the light detection means having the maximum sensitivity at wavelength 490 nm other than the main luminescent line of the fluorescent light and the light detection means having the maximum sensitivity at red wavelength 690 nm. However, the maximum sensitivity is not limited to them, i.e., a light detector having maximum sensitivity at wavelength 570 nm or 390 nm can be also used to constitute the above means.

(Eighth Embodiment)

Figure 20:
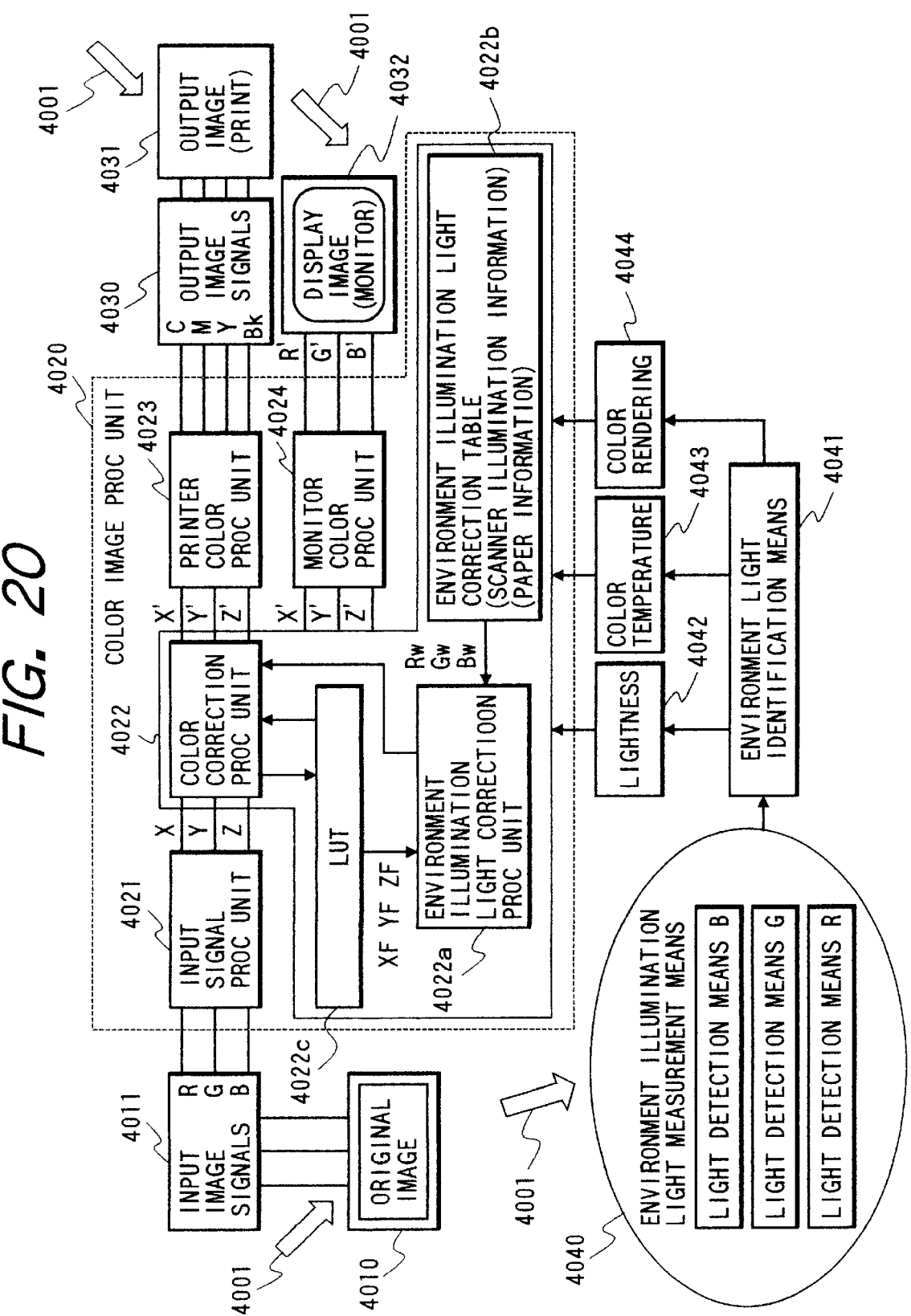
FIG. 20 is a block diagram showing an example of an image processing apparatus according to an eighth embodiment of the present invention.

FIG. 20 is a block diagram showing an example of a color image process unit (i.e., color image input/output apparatus) according to the eighth embodiment of the present invention. In the present embodiment, such color image process unit is applied to a system which inputs image data and then outputs it to a printer or a monitor.

In FIG. 20, reference numeral 4001 denotes environment illumination light for illuminating an original image 4010, an output print 4031 and an output monitor 4032. Reference numeral 4011 denotes input image signals, e.g., R, G and B signals in NTSC system which are obtained under standard illumination light. Reference numeral 4020 denotes a color image process unit which processes the image signal to generate a signal suitable for outputting under observation environment illumination light. The color image process unit 4020 is composed of an input signal process unit 4021 which performs density correcting and gamma correcting on the input signals by using correction parameters to convert them into chromaticity signals X, Y and Z, a color correction process unit 4022 which performs optimum correcting on the chromaticity signals as it takes into consideration environment illumination light information or the like, a printer color process unit 4023 which converts color-corrected signals X', Y' and Z' into C, M, Y and Bk signals 4030 suitable for printer outputting, a monitor color process unit 4024 which converts the signals X' Y' and Z' into R, G and B signals suitable for monitor outputting, and the like. The color image process unit 4020 is controlled as a whole by a CPU (not shown).

The print (i.e., output image) 4031 is formed by a printer unit (not shown) on the basis of the C, M, Y and Bk signals 4030, and a display image is outputted and displayed on a monitor 4032 such as a CRT or the like on the basis of the R, G and B signals.

The color correction process unit 4022 is composed of an environment illumination light correction process unit 4022a, an environment illumination light correction table (i.e., light source correction table) 4022b which generates a correction amount signal from scanner illumination information or the like, a look-up table 4022c, and the like. Reference numeral 4040 denotes an environment illumination light measurement means which measures the environment illumination light 4001 illuminating the print 4031 and the monitor 4032, and can store data according to the illumination light into an environment light identification means (i.e., memory) 4041.

Figure 21:
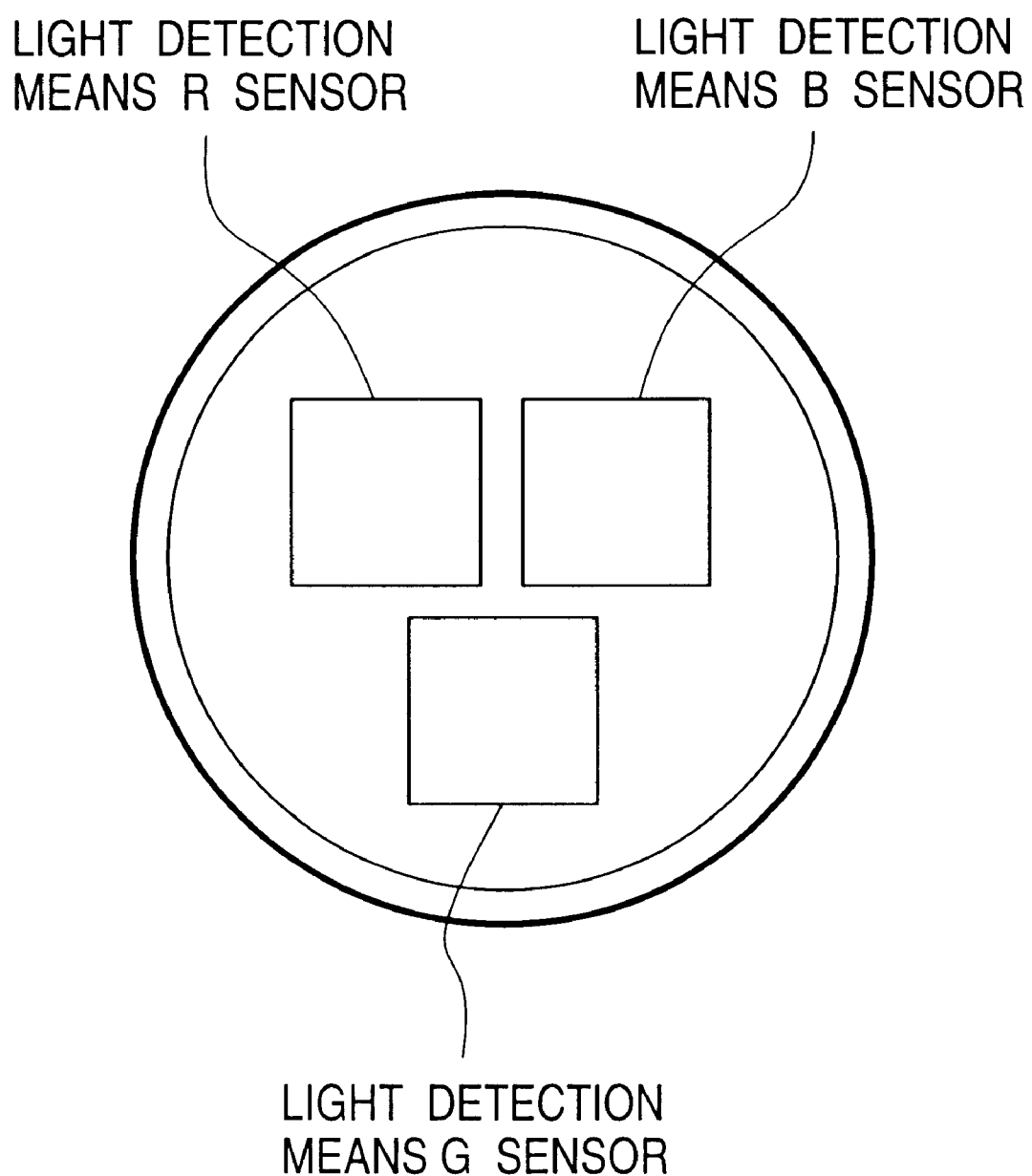
FIG. 21 is a view showing structure of an environment light measurement means.
Figure 22:
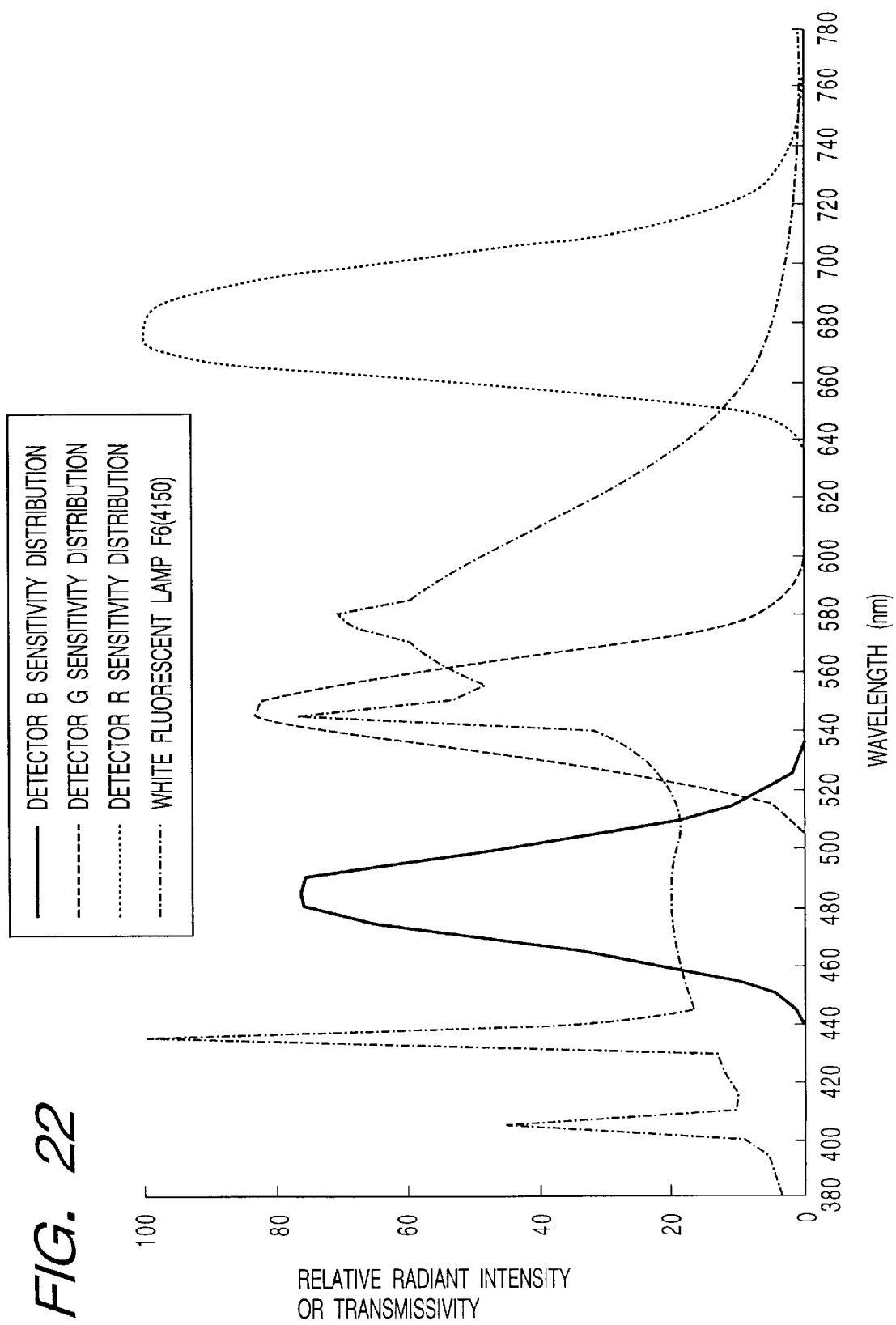
FIG. 22 is a view showing relative spectral intensity of fluorescent light and spectral sensitivity of the environment light measurement means.

The environment illumination light measurement means 4040 has three sensors which respectively have such spectral sensitivity characteristics as shown in FIG. 22 and are arranged as shown in FIG. 21. Each sensor has structure for receiving the light selected by combination of a silicon photocell and an interference filter. A light detection means G sensor has maximum sensitivity at wavelength 546 nm of a main luminescent line, a light detection means B sensor has maximum sensitivity at wavelength 485 nm not including the main luminescent line, and a light detection means R sensor has maximum sensitivity at the other wavelength 680 nm not including the main luminescent line. By such structure, light intensity of a luminescent line wavelength portion in the environment illumination light and light intensity of a wavelength portion from which the luminescent line has been eliminated can be measured.

In the above sensor, the combination of the silicone photocell and the interference filter is used as a wavelength selection filter. However, in the point of cost, such wavelength selection filter can be realized by combination of the interference filter and a color filter or combination of the color filters.

Reference numeral 4041 denotes the environment light identification means which identifies lightness 4042, color temperature 4043 and color rendering 4044 and sends them to the color image process unit 4020 as signals.

Figure 23:
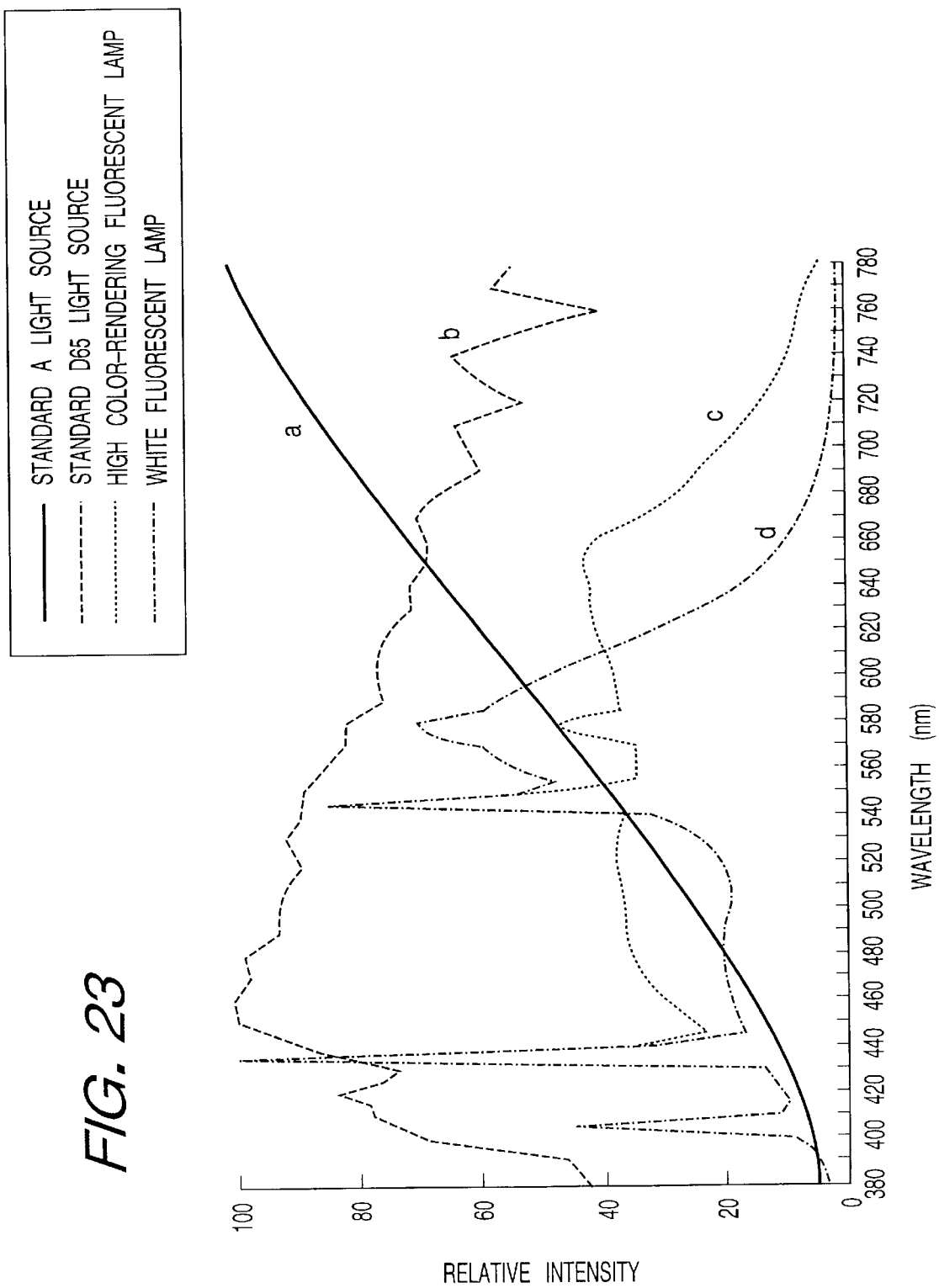
FIG. 23 is a view showing relative spectral intensity of standard illumination light.
Figure 24:
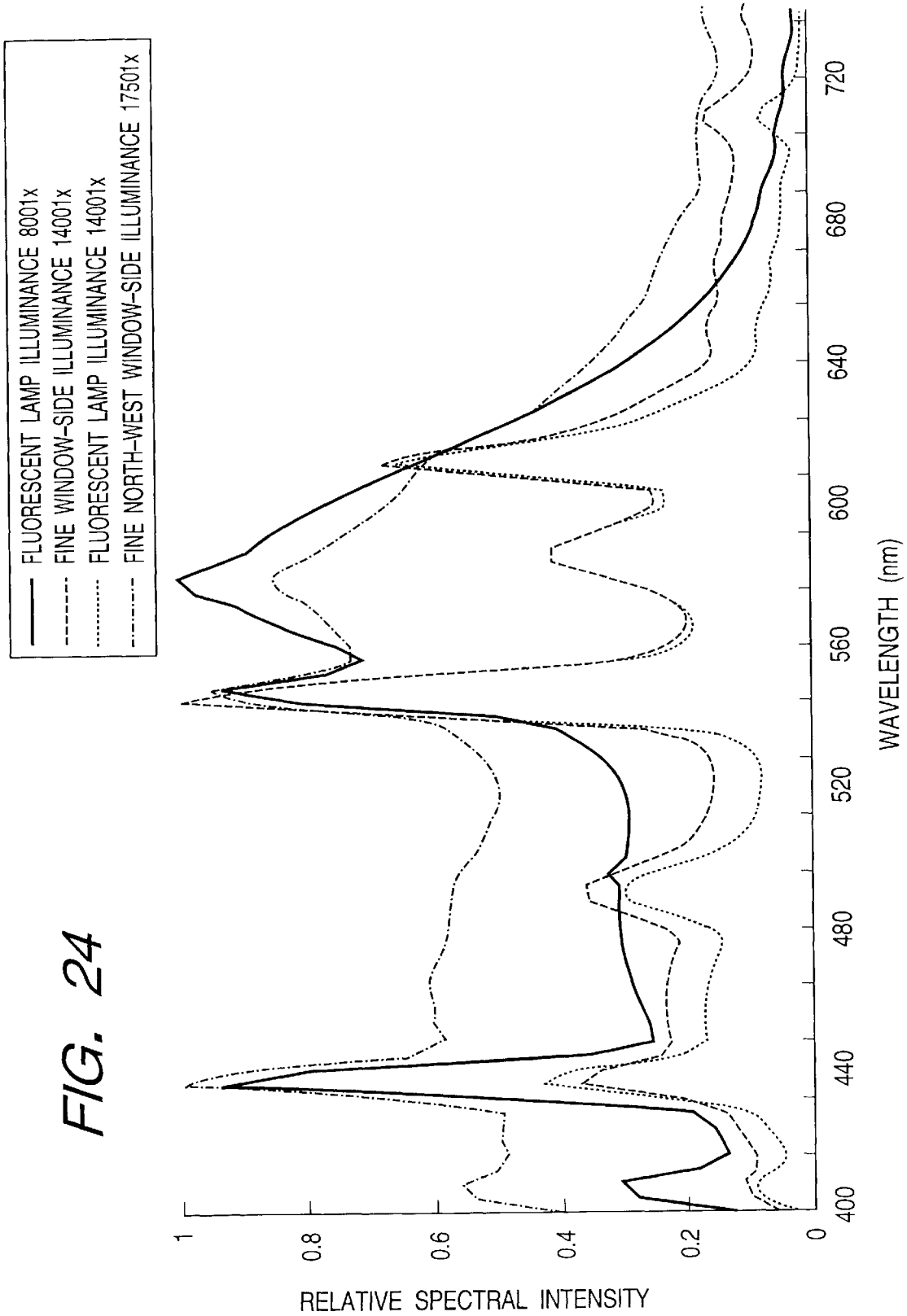
FIG. 24 is a view showing the relative spectral intensity in a case where the fluorescent light and external light are mixed.

A method for identifying the illumination light source will be explained hereinafter. Lightness of green light in the luminescent wavelength portion included in the illumination, and lightness of blue light and red light in the portion except for the luminescent portion highly vary according to the illumination light source as shown in FIGS. 23 and 24. Therefore, after the lightness of luminescent line wavelength portion and outputs of blue and red portions other than the luminescent portion are measured, ratio of each measured value to an entire light amount is calculated, and illumination lightness or the like is additionally considered. Thus, the ratio is compared with the light source data stored in the environment light identification means (i.e., memory) 4041, thereby identifying the lightness 4042, the color temperature 4043 and the color rendering 4044 respectively.

Figure 25:
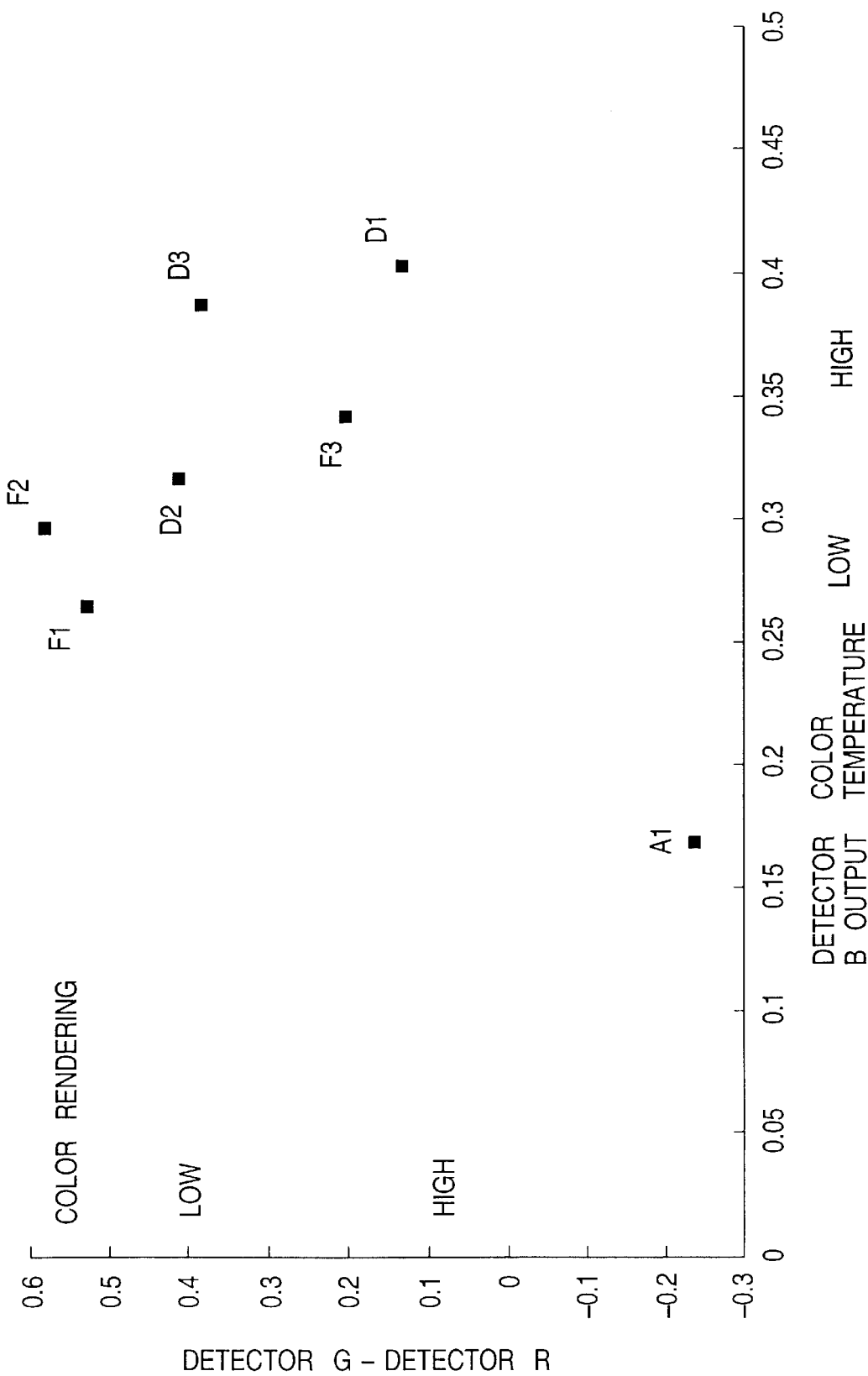
FIG. 25 is a view for explaining an operation to identify color temperature and color rendering with an environment light identification means.
Figure 26:
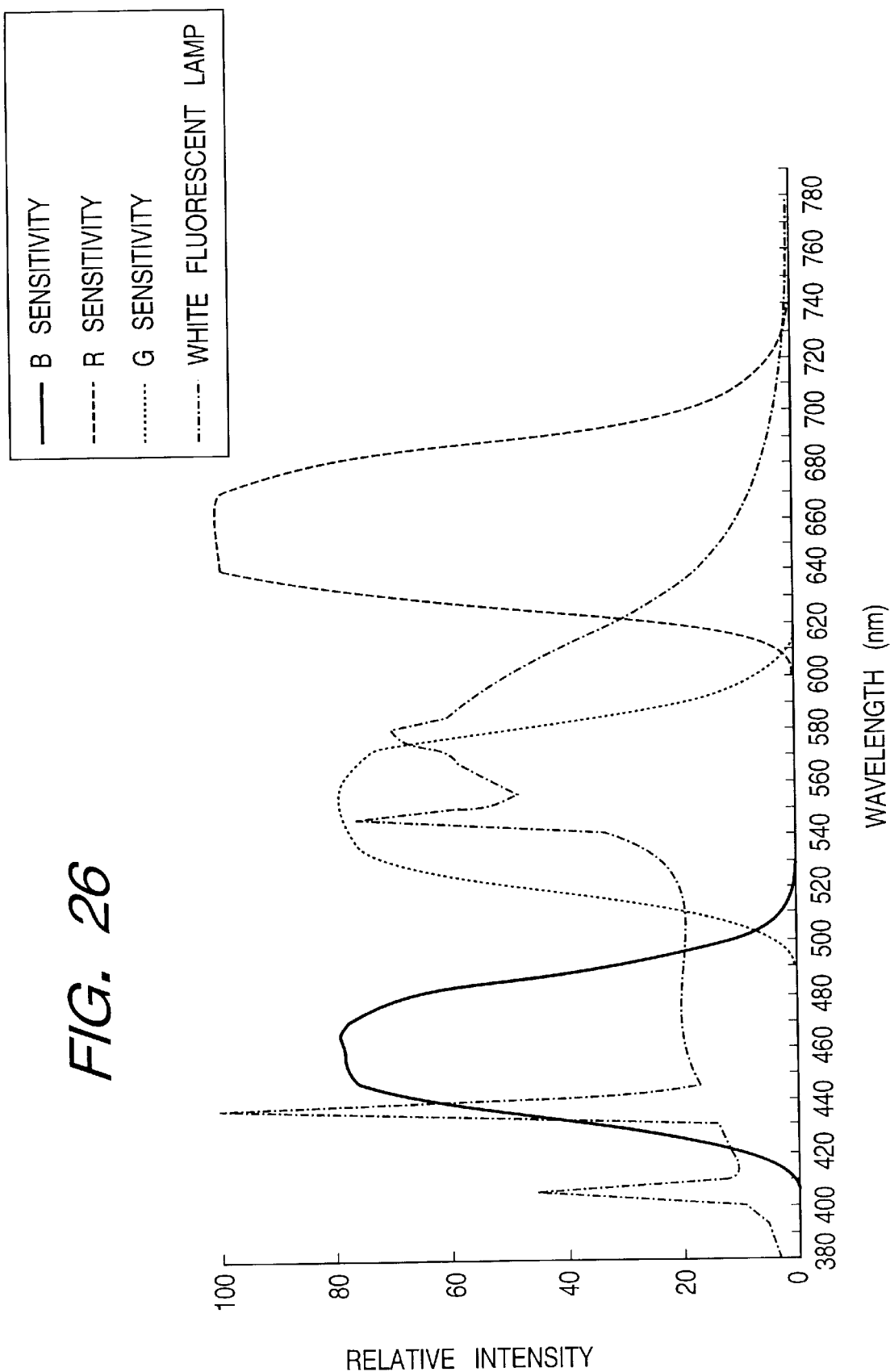
FIG. 26 is a view showing the relative spectral intensity of the fluorescent light and the spectral sensitivity of the conventional environment light measurement means.
Figure 27:
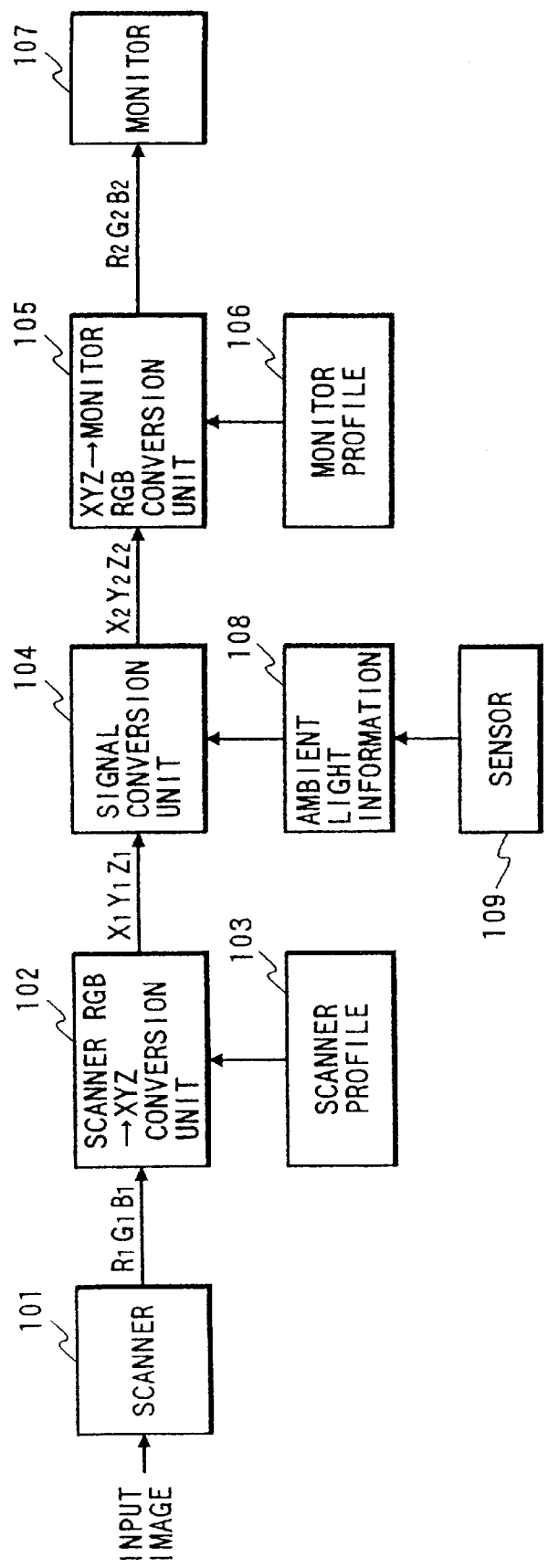
FIG. 27 is a block diagram showing structure of conventional art.
Figure 28:
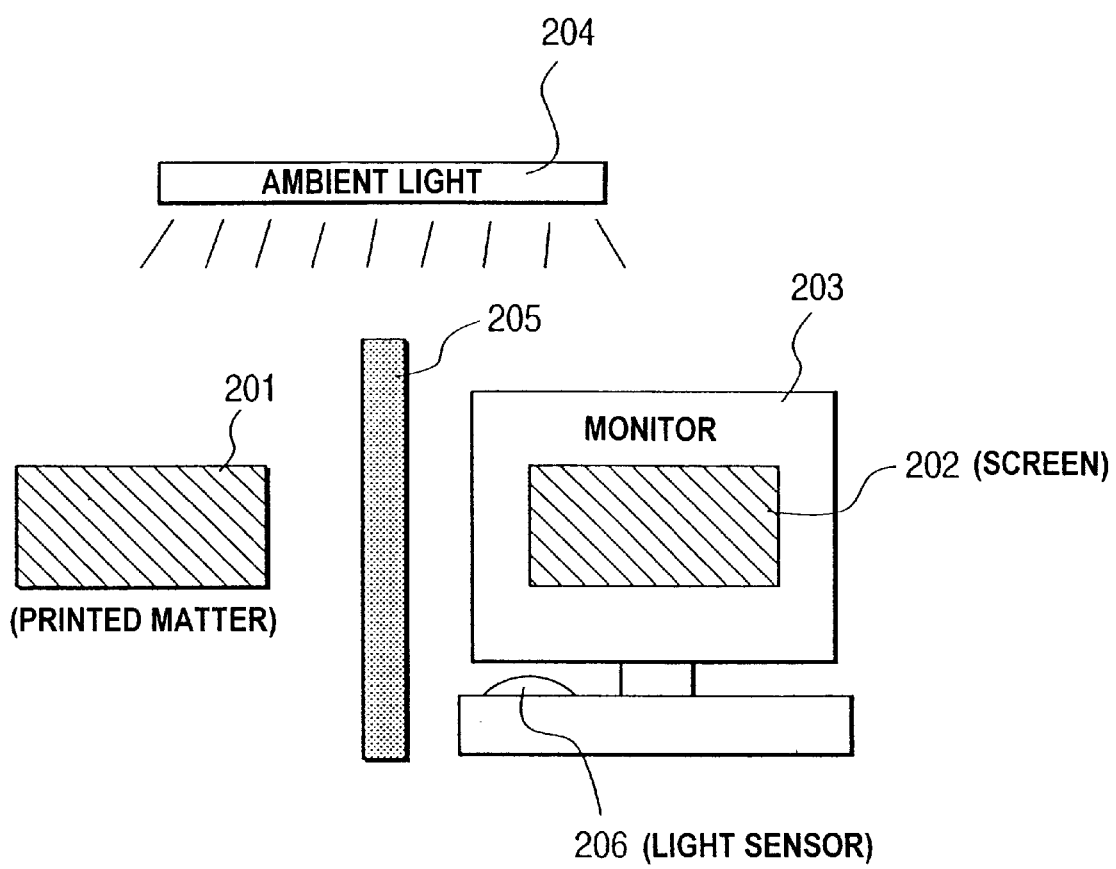
FIG. 28 is a view showing observing the environment of an image.

FIG. 25 is a view in which output ratio (axis of abscissa) of the light detection means B sensor to the total outputs of the three sensors of the environment illumination light measurement means 4040 and difference (axis of ordinate) in output ratio between the light detection means G sensor and R sensor are plotted according to the change in environment light.

The color rendering is determined according to the value along the axis of ordinate in FIG. 25. For example, if the value is equal to or smaller than 0.2, it is judged that the color rendering is good, but if the value is equal to or larger than 0.45, it is judged that the color rendering is bad. Further, if the value is within a range from 0.2 to 0.45, it is judged that the color rendering is medium. In the example shown in FIG. 25, even if the same-type fluorescent illumination lights are judged, their color rendering are located and classified at points F1, D2, F3 and the like, respectively. That is, the point F1 represents the ordinary fluorescent light and thus its color rendering is bad, the point F3 represents the high-color-rendering fluorescent light and thus its color rendering is good, and the point D2 represents the illumination in which the ordinary fluorescent light and outdoor light are mixed and thus its color rendering is medium.

Also, the color temperature is determined according to the value along the axis of abscissa in FIG. 25. For example, if the value is equal to or smaller than 0.2, it is judged that the color temperature is low, and if the value is within a range from 0.2 to 0.35, it is judged that the color temperature is medium. Further, if the value is equal to or larger than 0.35, it is judged that the color temperature is high. Then, based on such the judging, the color temperature is classified. In the example shown in FIG. 25, a point A1 represents a standard light source A and that its color temperature is low, the point F3 represents the high-color-rendering fluorescent light and that its color temperature is medium, and a point D1 represents a standard illumination D65 and that its color temperature is high.

As above, the color rendering and the color temperature are respectively classified into several groups, and attribute signals of the color rendering and the color temperature are sent from the environment light identification means 4041 to the color correction process unit 4022. Then, coefficients suitable for the respective groups are selected.

The color temperature may be classified by a known color temperature measurement device instead of the light detection means B sensor. Further, since thresholds for identifying the color rendering and the color temperature are values which are set based on the characteristic of each sensor, the thresholds are different according to the characteristic of each sensor.

Subsequently, operation in the present embodiment will be explained hereinafter with reference to FIG. 20. Initially, the original image 4010 is read by a scanner (not shown) in the form of the R, G and B input image signals 4011 obtained under the standard illumination. Then, the signals are sent to the input signal process unit 4021 to be subjected to the density correcting and the gamma correcting, and then converted into the chromaticity signals X, Y and Z.

Then, a color space compression process is performed by using the look-up table 4022c to adjust difference in color reproduction gamut between difference devices, whereby the chromaticity signals X, Y and Z are converted into chromaticity signals XF, YF and ZF, respectively.

On the other hand, the environment illumination light measurement means 4040 measures the environment illumination light 4001 under which the original image 4010 and the print 4031 are observed, and stores the measured data as environment illumination light information. The CPU (not shown) identifies the lightness 4042, the color temperature 4043 and the color rendering 4044 in accordance with the measured environment illumination light information. Then, the CPU sends three-primary-color RWGWBW signals of the white data to be corrected, from the environment illumination light correction table 4022b previously obtained from experiment, to the environment illumination light correction process unit 4022a, and controls these signals to be used in the correcting.

It is considered that the reference white point varies according to the illumination light. Thus, the correcting of the illumination light color temperature and the lightness are performed by using, e.g., the Von Kries color adaptation prediction equation.

In such a Von Kries method, the standard illumination light under which the matrix is formed is assumed as, e.g., three primary colors FRFGFB which are formed by the above-described fluorescent illumination light and obtained in a known conversion method on the basis of the tristimulus values FX, FY and FZ of a print paper and a monitor white point in the case where the observation environment illumination light is identical with the standard illumination light, and the value to be corrected of the print or the like illuminated by the environment light different from standard one is assumed as tristimulus values X'Y'Z'. Such relation can be expressed by the Von Kries equation, as follows.

$$\begin{bmatrix} X' \\ Y' \\ Z' \end{bmatrix} = (M)^{-1}(D)(M) \begin{bmatrix} FX \\ FY \\ FZ \end{bmatrix}$$

In the equation, reference symbol (M) denotes a constant which can be represented by a 3×3 matrix defined from the basic primary color, and reference numeral (D) denotes a shift amount of the white point which can be represented as follows.

$$(D) = \begin{bmatrix} Rk & 0 & 0 \\ 0 & Gk & 0 \\ 0 & 0 & Bk \end{bmatrix}$$

where Rk=RW/FR, Gk=GW/FG and Bk=BW/FB.

Further, the color rendering is corrected by using a color rendering conversion matrix according to such color rendering. In this case, for example, color measuring of many color chips is performed by the standard illumination light D65 of which color rendering is good to obtain chromaticity values X1, Y1 and Z1 of each color chip, color measuring of the same color chips is subsequently performed by a light source representative of the color rendering group to obtain chromaticity values X2, Y2 and Z2 of each color chip, and then a coefficient optimum for the converting is obtained from many chromaticity values in the form of 3×3 matrix in least square method, whereby the correction coefficient can be obtained. Therefore, the memory stores the conversion coefficients which were formed in the above manner and correspond to each color rendering.

Of course, in the case where the density (lightness) or the color area exceeds a reproduction output gamut, further correcting can be performed in a known method.

In addition to such the correcting, the color correction process unit 4022 performs the correcting to obtain the tristimulus value signals X', Y' and Z'. Then, these signals are converted by the printer color process unit 4023 into the C, M, Y and Bk output image signals 4030 suitable for the printer outputting and by the monitor color process unit 4024 into R', G' and B' signals optimum for the monitor displaying. Such converting is performed by using a known method, thereby obtaining the print 4031 and the monitor image as the output images.

By such the processes, image is reproduced with the color which is different from that in the standard illumination light, whereby such image can be corrected to be suitable for the varied environment illumination light.

In the above-described embodiment, the environment illumination light measurement means is composed of the light detection means G sensor having the maximum sensitivity at the wavelength 546 nm of the main luminescent line of the fluorescent light, the light detection means R sensor having the maximum sensitivity at the wavelength 680 nm of red, and the light detection means B sensor having the maximum sensitivity at the wavelength 485 nm of blue. However, the maximum sensitivity wavelengths are not strictly limited to these wavelengths. Further, the color temperature identification means may be provided independently. The color image correction process in this case is substantially the same as that in the above-described present embodiment.

Furthermore, the color temperature identification means may be provided instead of the light detection means B sensor having the maximum sensitivity at the wavelength 490 nm of blue. In this case, the color temperature is corrected without classification (i.e., not making group), whereby the color rendering is identified on the basis of the output ratio of light detection means G and R sensors. The process and its result are substantially the same as those in the above-described present embodiment.

According to the present embodiment, the lightness, the color temperature and the color rendering according to the change of illumination light can be accurately identified by the environment illumination light measurement means, so that the color correcting according to the environment illumination light can be performed.

Therefore, even if the standard illumination light under which the profile data is generated is different from the environment illumination light under which the observing is performed, an output image can be obtained in which a tint is matched with the input image.

(Other Embodiments)

The present invention can be applied to the system constructed by the plurality of equipments (e.g., host computer, interface equipment, reader, printer and the like) or can be also applied to the apparatus comprising the single equipment (e.g., copy machine, facsimile machine).

The invention employed by a method wherein program codes of a software to realize the functions of the above-described embodiments are supplied to a computer in an apparatus or a system connected to various devices so as to make the devices operative in order to realize the functions of the above-described embodiments and the various devices are operated in accordance with the programs stored in the computer (CPU or MPU) of the system or apparatus is also included in the scope of the present invention.

In such a case, the program codes themselves of the software realize the functions of the above-described embodiments and the program codes themselves and means for supplying the program codes to the computer, e.g., a storage medium in which the program codes have been stored, construct the present invention.

As such a memory medium to store the program codes, e.g., it is possible to use a floppy disk, a hard disk, an optical disk, a magneto-optical disk, a CD-ROM, a magnetic tape, a nonvolatile memory card, a ROM or the like can be used.

Also, it is of course included in the scope of the present invention even in not only a case where the functions of the above-described embodiments are realized by executing the supplied program codes by the computer but also a case where the functions of the above-described embodiments are realized in cooperation with the OS (operating system) by which the program codes operate in the computer or another application software or the like.

Further, of course, the present invention also includes a case where the supplied program codes are stored into a memory provided for a function expansion board of a computer or a function expansion unit connected to a computer and, after that, a CPU or the like provided for the function expansion board or the function expansion unit executes a part or all of the actual processes on the basis of instructions of the program codes, and the functions of the above-described embodiments are realized by the processes.

What is claimed is:

1. An image processing apparatus for performing color correction corresponding to environment light, said apparatus comprising:

an input unit adapted to input ultraviolet-range intensity information of the environment light and visible-range intensity information of the environment light and information of a recording medium;

an obtaining unit adapted to obtain standard white data that is a standard when observing an output image from the ultraviolet-range intensity information of the environment light and the visible-range intensity of the environment light and the recording medium information; and a color correction unit adapted to perform color correction corresponding to a fluorescent whitening effect based on the recording medium and the environment light by using the standard white data.

2. An apparatus according to claim 1, wherein the recording medium information is white information of the recording medium and wherein said color correction unit performs a color adaptation conversion process.

3. An apparatus according to claim 1, further comprising:

a generating unit adapted to perform a conversion process by using a profile corresponding to an input device and generating color image data not dependent on the input device, wherein said color correction unit performs the color correction for the color image data not dependent on the input device.

4. An apparatus according to claim 1, further comprising:

an environment light detection unit including a light reception unit adapted to measure the ultraviolet-range illumination intensity of the environment light and a light reception unit adapted to measure the visible-range illumination intensity.

5. An image processing method of performing color correction corresponding to environment light, said method comprising:

an input step, of inputting ultraviolet-range intensity information of the environment light and visible-range intensity information of the environment light and information of a recording medium;

an obtaining step, of obtaining standard white data that is a standard when observing an output image from the ultraviolet-range intensity information of the environment light and the visible-range intensity of the environment light and the recording medium information; and a color correction step, of performing color correction corresponding to a fluorescent whitening effect based on the recording medium and the environment light by using the standard white data.

6. A method according to claim 5, wherein the recording medium information is white information of the recording medium and wherein said color correction step performs a color adaptation conversion process.

7. A method according to claim 5, further comprising:

a generation step of performing a conversion process by using a profile corresponding to an input device and generating color image data not dependent on the input device, wherein said color correction step performs the color correction for the color image data not dependent on the input device.

8. A computer readable medium having recorded thereon codes for implementing a computer implementable method of image processing for performing color correction corresponding to environment light, comprising:

an input step, of inputting ultraviolet-range intensity information of the environment light and visible-range intensity information of the environment light and information of a recording medium;

an obtaining step, of obtaining standard white data that is a standard when observing an output image from the ultraviolet-range intensity information of the environment light and the visible-range intensity of the environment light and the recording medium information; and a color correction step, of performing color correction corresponding to a fluorescent whitening effect based on the recording medium and the environment light by using the standard white data.

* * * * *